US008401362B2

(12) United States Patent
Bedingfield, Sr. et al.

(10) Patent No.: US 8,401,362 B2
(45) Date of Patent: Mar. 19, 2013

(54) INDICATION OF TRICKPLAY AVAILABILITY FOR SELECTED MULTIMEDIA STREAM

(75) Inventors: James Carlton Bedingfield, Sr., Lilburn, GA (US); John Stefanik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1010 days.

(21) Appl. No.: 12/107,885

(22) Filed: Apr. 23, 2008

(65) Prior Publication Data

US 2009/0269025 A1 Oct. 29, 2009

(51) Int. Cl.
*H04N 5/931* (2006.01)

(52) U.S. Cl. ........................................................ 386/206

(58) Field of Classification Search .................. None
See application file for complete search history.

(56) References Cited

U.S. PATENT DOCUMENTS

| | | | |
|---|---|---|---|
| 5,687,275 A | 11/1997 | Lane et al. | |
| 6,434,748 B1 | 8/2002 | Shen et al. | |
| 6,654,539 B1 | 11/2003 | Duruoz et al. | |
| 7,132,973 B2 | 11/2006 | Jindal | |
| 7,231,132 B1 | 6/2007 | Davenport | |
| 2007/0050597 A1 | 3/2007 | Ikeda | |
| 2007/0066394 A1 | 3/2007 | Ikeda et al. | |
| 2007/0300261 A1* | 12/2007 | Barton et al. | 725/58 |

* cited by examiner

*Primary Examiner* — Brandon Hoffman

(74) *Attorney, Agent, or Firm* — Guntin & Gust, PLC; Jay H. Anderson

(57) ABSTRACT

A user is able to select a multimedia stream from a plurality of multimedia streams available at a multimedia receiver. The availability of one or more trickplay features for the selected multimedia stream is determined in response to the selection of the multimedia stream. A visual indicator, an audible indicator, or both are selectively provided for display/output based on the determined availability status of the corresponding trickplay feature. The selective provision of a trickplay indicator can include providing a first trickplay indicator when the trickplay feature is available and providing a second, different trickplay indicator when the trickplay feature is unavailable. Alternately, the selective provision of a trickplay indicator includes providing the trickplay indicator when the trickplay feature is unavailable and omitting provision of the trickplay indicator when the trickplay feature is available, or vice versa.

22 Claims, 12 Drawing Sheets

INDICATION OF TRICKPLAY AVAILABILITY FOR SELECTED MULTIMEDIA STREAM

CROSS-REFERENCE TO RELATED APPLICATION

Related subject matter is contained in the following copending application:

Application Ser. No. 12/107,884, filed on Apr. 23, 2008, entitled "Indication of Trickplay Availability via Remote Control Device," invented by James Carlton Bedingfield, Sr. and John Stefanik, and assigned to the assignee hereof.

FIELD OF THE DISCLOSURE

The present disclosure generally relates to processing of multimedia content for provision, and more particularly, to the implementation of trickplay modes in processing of multimedia content.

BACKGROUND

Many multimedia content formats facilitate the implementation of one or more trickplay features (e.g., pause, fast-forward, fast-reverse, skip, seek, etc.) in the presentation of the associated multimedia content. For other multimedia content formats, however, one or more of these trickplay features may be unavailable for other multimedia streams, either as a result of an intended disabling of certain trickplay features for digital rights management (DRM) purposes or due to an inherent technical limitation of the format, encoding technique, or the manner in how or where the content is stored. To illustrate, if future content has not yet been received for multimedia program, a fast-forward trickplay feature necessarily cannot yet be implemented. It often is not apparent to a user as to which multimedia streams are enabled to support trickplay features and which are not so enabled.

Single-source implementations sometimes are configured to notify the user that a trickplay feature is unavailable for the presentation of the multimedia content in response to a user's attempt to initiate the trickplay feature. For example, certain digital versatile disk (DVD) players are configured so as to provide an icon for display at a television when the user attempts to initiate certain trickplay features during playback of a trickplay-disabled section of a DVD (e.g., when a user attempts to skip or fast forward through the presentation of the copyright notice that is often found at the start of a motion picture). The current focus in the delivery of multimedia content is the gathering of multimedia content from disparate sources and the presentation of such content in a unified and uniform manner through a set-top box or other device at a user's premises. Under this scheme, the user may not be aware of the source of the multimedia content or the manner of its encoding, formatting, or transmission and thus may not know which trickplay features are available as the user otherwise would if there was only a single source of multimedia content. This unified, uniform delivery of multimedia content therefore can exacerbate a user's confusion regarding whether trickplay features are available for a given multimedia stream. Such confusion can lead to user frustration when the user attempts to initiate an unavailable trickplay feature and does not observe the expected result. Accordingly, an improved technique for notifying a user of the availability of trickplay features would be advantageous.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
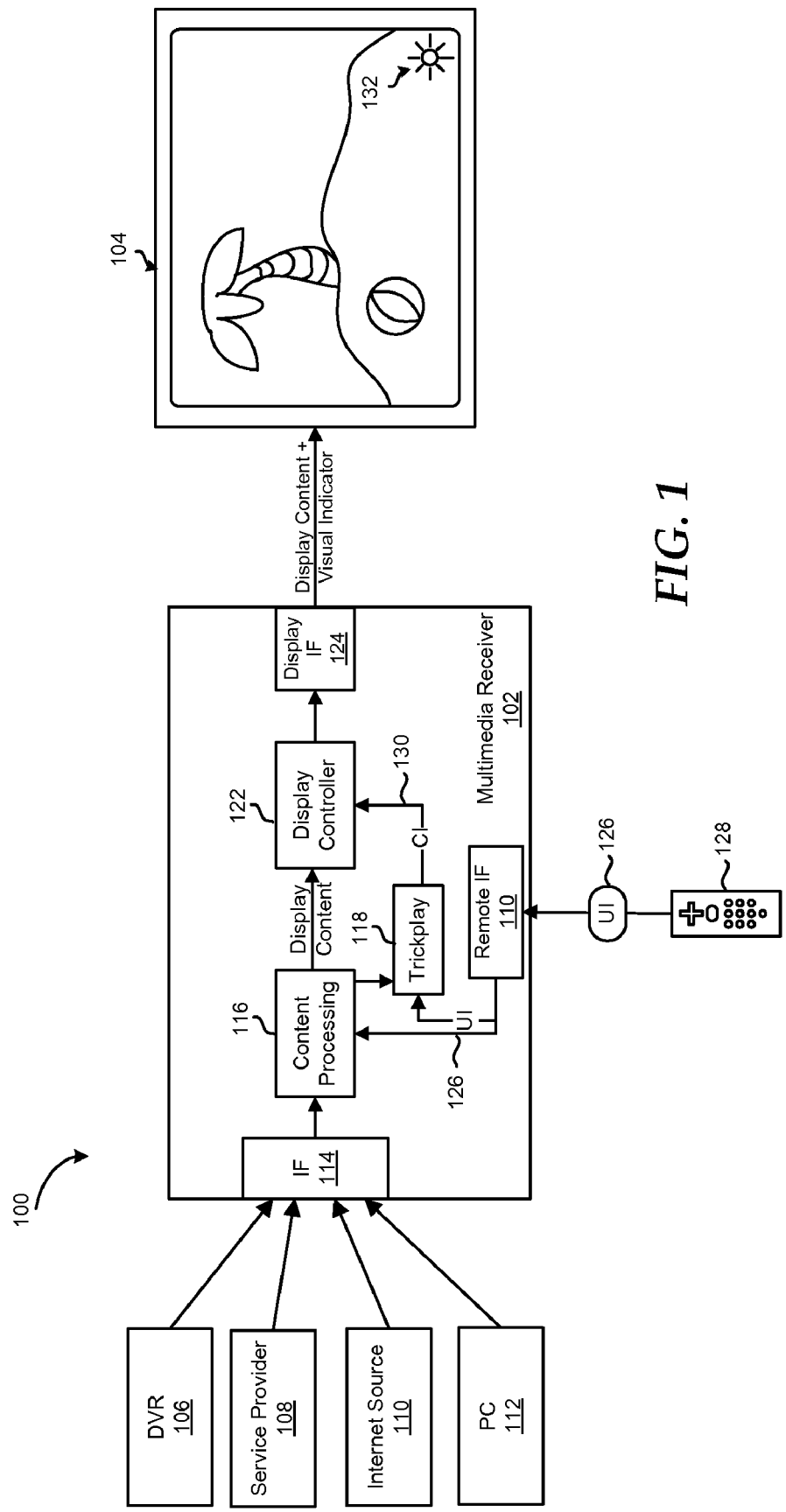
FIG. 1 is a block diagram illustrating a multimedia system having a visual indication of availability of one or more trickplay features in accordance with at least one embodiment of the present disclosure.

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

FIGS. 1-18 illustrate example techniques for notifying a user of the availability status of one or more trickplay features for a given multimedia stream. In one embodiment, the user is able to select a multimedia stream from a plurality of available multimedia streams from one or more sources. The availability of one or more trickplay features for the selected multimedia stream is determined in response to the selection of the multimedia stream from the plurality of available multimedia streams. A visual indicator, an audible indicator, or both are selectively provided for display/output based on the determined availability status of the corresponding trickplay feature. The selective provision of a trickplay indicator can include providing a first trickplay indicator when the trickplay feature is available and providing a second, different trickplay indicator when the trickplay feature is unavailable. Alternately, the selective provision of a trickplay indicator includes providing the trickplay indicator when the trickplay feature is unavailable and omitting provision of the trickplay indicator when the trickplay feature is available, or vice versa. In another embodiment, a trickplay indicator of the availability status of a trickplay feature can be provided via a remote control device utilized by the user. The trickplay indicator can include a visual indicator, an audible indicator, or both. The provision of the trickplay indicator can be in response to temporarily selecting a multimedia stream (e.g., providing focus to the corresponding listing entry in an electronic programming guide), in response to the initiation (or reinitiation) of the presentation of the multimedia content of the multimedia stream, in response to detection motion of the remote control device, or combinations thereof. The trickplay indicator can be selectively provided at the remote control device, i.e., different indicators can be provided based on the availability status, the provision or omission of provision of an indicator can be based on the availability status, or a combination thereof.

The term "multimedia content" refers to video content, audio content, or a combination thereof. The term "multimedia stream" refers to a data grouping (a data stream, a data file, etc.) representative of associated multimedia content. The term "trickplay feature" refers to a presentation (or "playback") of multimedia content at a different rate (zero or non-zero) than the normal/standard presentation rate, in a reverse direction of the normal/standard presentation direction, or a combination thereof. Trickplay features include, but are not limited to, pausing playback, stopping playback, slow playback, fast forward playback (at one or more rates), reverse playback, slow reverse playback, fast reverse playback (at one or more rates), frame advance, scene/chapter advance ("skip"), scene/chapter reverse, advance to the beginning or end of the program, advance forward or reverse X seconds, and the like.

For ease of illustration, certain techniques disclosed herein are described in an example context of an Internet Protocol Television (IPTV) network utilizing a multimedia receiver (e.g., a set top box (STB) device) at a user's premises to interface between a display device, such as a television, monitor or display screen, and the multimedia content distribution network of a service provider. However, these techniques also can be implemented in other contexts without departing from the scope of the present disclosure. In the context of a relatively fixed multimedia receiver, a user's premises can include, for example, a residence or place of work of the user, a car, a boat, an airplane or other vehicle, and the like. In the context of a portable multimedia receiver, such as a multimedia-enabled cellular phone, a user's premises can include the user's personal space while operating the multimedia receiver.

FIG. 1 illustrates an example multimedia system 100 configured to provide a visual indication of an availability of one or more trickplay features in accordance with at least one embodiment of the present disclosure. The multimedia system 100 includes a multimedia receiver 102 and a display device 104 at a user's premises, and one or more local or remote multimedia sources of multimedia streams, such as a digital video recorder (DVR) 106, a service provider 108 (e.g., a cable or satellite television provider), an Internet source (e.g., a web page) 110, or a locally-connected personal computer (PC) 112 or other home entertainment device (referred to collectively as "multimedia sources 106-112"). The multimedia receiver 102 can include, for example, a set top box (STB) device, a digital network radio receiver, a portable multimedia device (e.g., a multimedia-enable cellular phone or a digital radio receiver), and the like.

In the depicted example, the multimedia receiver 102 includes a source interface 114, a content processing and storage module 116 (hereinafter, content processing/storage module 116"), a trickplay controller 118, a remote control interface 120, a display controller 122, and a display interface 124. The source interface 114 is configured to receive multimedia streams from some or all of the multimedia sources 106-112. The source interface 114 can include a plurality of sub-interfaces, each to interface with one or a subset of the multimedia sources 106-112. For example, the source interface 114 could include a High-Definition Multimedia Interface (HDMI)-type interface to connect to the DVR 106, a network interface (e.g., an Ethernet interface) to connect to a network gateway (e.g., a cable modem or a digital subscriber line (DSL) line), which in turn is connected to the service provider 108 and the Internet source 110 via a private or public network, and a wireless interface (e.g., an IEEE 802.11 interface) to connect to the PC 112. The multimedia receiver 102 further implements a software and hardware environment (not shown) that manages the functions of the multimedia receiver 102 and one or more busses, switch fabrics, or other interconnects so as to facilitate high-speed, bi-directional signaling and transportation of content and command information between functional components of the multimedia receiver 102.

The remote control interface 120 comprises any of a variety of wireless interfaces (e.g., a radio frequency (RF) interface or an infrared interface, etc.) and is configured to wirelessly receive user input 126 from a remote control device 128 and provide the user input 126, or a representation thereof, to the content processing/storage module 116 and the trickplay controller 120. The user input 126 can include any of a variety of commands, including source/channel selection, trickplay feature selection for a multimedia stream being displayed, and the like.

The content processing/storage module 116 includes one or more multimedia processing engines for processing incoming multimedia streams in accordance with their encoding formats so as to render display content (and audio content) for output to the display device 104. For example, the content processing/storage module 116 can include an MPEG-2 or MPEG-4 decoder for incoming MPEG streams, a National Television Standards Committee (NTSC) receiver or an Advanced Television Systems Committee (ATSC) receiver for multimedia streams transmitted in accordance with the NTSC standard or the ATSC standard, respectively. As another example, the multimedia processing engine can include a processor and software (or hardware-based implementation) configured to decode incoming multimedia content encoded in accordance with any of a variety of video file formats, such as the Audio Video Interleave (AVI) format, the Google™ Video (GVI) format, the Apple™ Quicktime™ format, the RealPlayer™ streaming video format, and the like. The content processing/storage module 116 further can includes a digital rights management (DRM) controller, an electronic (or "enhanced") programming guide (EPG) controller, and the like. The content processing/storage module 116 further can include one or more buffers or other storage devices to buffer a received multimedia stream so as to enable processing of the received multimedia stream, particularly for use in implementing certain trickplay features (if enabled). Alternately, the buffering capability can be implemented external to the multimedia receiver 102 (e.g., at the DVR 106). In addition to, or instead of, implementing trickplay functionality locally at the content processing/storage module 116, in one embodiment the content processing/storage module 116 is configured to communicate with the source of the multimedia stream so as to implement a desired trickplay feature at the source as it is providing the multimedia stream (or a trickplay version of it) to the multimedia receiver 102.

Further, in one embodiment, the content processing/storage module 116 is configured to filter content, as in a program guide (EPG) display, to only show or list programs with (or, alternately, without) trickplay capabilities. For instance, a user may want to only see video-on-demand (VOD) content that has full trickplay features listed in a particular EPG. Additionally, in one embodiment, the content processing/storage module 116 is configured to determine if a selected program with no/limited trickplay functionality is available from another source with full trickplay functionality, and if so, provide the user the option of playing the other version.

The trickplay controller 118 is configured to determine the availability of one or more identified trickplay features for a multimedia stream in response to the user's selection of the multimedia stream (e.g., via the user input 126) and provide one or more controllability indicators 130 to the display controller 122 based on the availability of the one or more identified trickplay features. The controllability indicator 130 represents the availability of the corresponding trickplay feature for the selected multimedia stream. The controllability indicator 130 can be implemented as, for example, a single-bit or multiple-bit data transmission, a transmission of a signal at a particular frequency associated with the corresponding availability, and the like. A single controllability indicator 130 can be sent for all of the trickplay features being analyzed, or a separate controllability indicator 130 can be sent for each trickplay feature. For example, if the trickplay controller 118 is configured to determine the availability of each of the fast reverse, fast forward, and skip features of the selected multimedia stream, the trickplay controller 118 can send a separate controllability indicator 130 for each of the fast reverse, fast forward, and skip features, or a single controllability indicator 130 can be sent so as to represent that either each of the trickplay features is available or to represent that one or more of the trickplay features is unavailable.

The trickplay controller 118 can determine the availability of one or more trickplay features for a selected multimedia stream in any of a variety of manners. In some instances, the trickplay controller 118 may determine the availability of a trickplay feature based on the source of the selected multimedia stream. Alternately, the trickplay controller 118 can determine the availability of a trickplay feature based on the encoding format of the selected multimedia stream or in the manner in which it is transmitted. To illustrate, certain encoding formats do not support (or have disabled) certain trickplay features and thus the trickplay controller 118 can automatically determine the availability of a trickplay feature if the multimedia stream is encoded in one of these encoding format. In another example, the trickplay controller 118 can determine that certain trickplay features are not available based on the buffered portion of the multimedia stream. To illustrate, if the content being processed for presentation is the most recent content available at the multimedia receiver 102, then a fast-forward trickplay feature is not available at that point. In another embodiment, the selected multimedia stream may be transmitted to the multimedia receiver 102 along with metadata that indicates the availability of certain trickplay features for some or all of the segments of the multimedia content and thus the trickplay controller 118 can determine the availability of certain trickplay features for a selected multimedia stream from this metadata. The metadata may be native to the encoding format or the source may add the metadata after encoding of the multimedia content.

The display controller 122 is configured to determine one or more visual indicators 132 to be displayed (if any) based on the availability of one or more corresponding trickplay features as represented by the controllability indicator 130. The visual indicator 132 is used to indicate to the user an availability of the corresponding trickplay feature for the multimedia content program selected by the user. In one embodiment, the visual indicator 132 can be provided for display when a particular trickplay feature is unavailable for the selected multimedia stream. Alternately, the visual indicator 132 can be provided for display when a particular trickplay feature is available for the selected multimedia stream. In another embodiment, one visual indicator 132 can be provided when the trickplay feature is available, and different visual indicator 132 can be provided when the trickplay feature is not available. As described in greater detail herein, the visual indicator 132 can be implemented in any of a variety of manners. To illustrate, the visual indicator 132 can be implemented so that a particular symbol, shape, color, intensity, shading, display position, or other feature conveys the availability status of the corresponding trickplay feature to the user. For example, a visual indicator having one shape or color can be provided to indicate to the user that the trickplay feature is available, while a visual indicator having a different shape or color can be provided to indicate the user that the trickplay feature is unavailable. As another example, a visual indicator can be provided for display when the trickplay feature is unavailable, and provision of the visual indicator is omitted when the trickplay feature is available.

If one or more visual indicators 132 are to be provided for display, the display controller 122 can generate an overlay layer with the one or more visual indicators 132 and provides the display content from the content processing/storage module 116 and the overlay layer to the display interface 124 for output for display on the display device 104, either as a single blended layer or as separate image layers for subsequent blending. Otherwise, if no visual indicator 132 is to be provided, the display controller 122 provides the display content to the display interface 124 without an overlay layer. The display interface 124 is configured to transmit signaling to control the display device 104 based on the output content. The display interface 124 can include any of a variety of interfaces to the display device 112, such as a digital video interface (DVI), a high-definition multimedia receiver (HDMI), an S-video interface, a composite video interface (e.g., a coaxial cable interface), a component video interface, and the like. The display interface 124 further can include an audio interface for providing audio signaling to the display device 104.

The content processing/storage module 116, the trickplay controller 118 and the display controller 122 can be implemented as software, hardware, firmware, or combinations thereof. For example, in one embodiment one or more of the content processing/storage module 116, the trickplay controller, or the display controller 122 each includes a computer readable medium (e.g., a memory, cache, optical disk drive, or a hard disk) (not shown) to store a program of instructions and one or more processors (not shown), whereby the program of instructions is executable by the one or more processors to manipulate the one or more processors so as to perform the techniques described herein with respect to the respective data processing module. As another example, they alternately can be implemented as one or more logic-based hardware state machines to implement the techniques described herein.

In an implementation of the multimedia receiver 102 as a single integrated device, such as a wireless multimedia phone, a portable computer, or gaming device, one or more button panels of the single integrated device can be implemented in place of the remote control device 128, the button panels including hard buttons, soft buttons, or combinations thereof, and the trickplay indicator can be shown on an embedded display or using key illumination as described herein.

Figure 2:
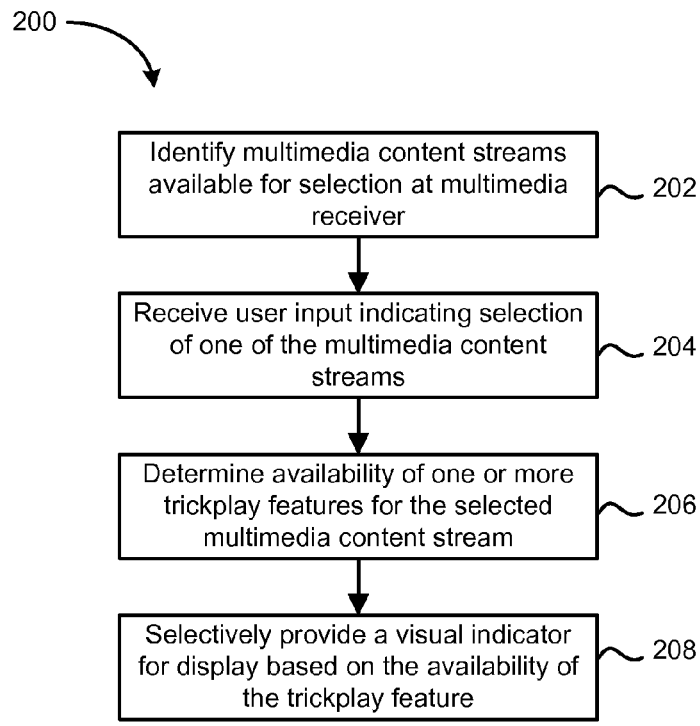
FIG. 2 is a flow diagram illustrating a method for selectively providing for display a visual indication of availability of one or more trickplay features in accordance with at least one embodiment of the present disclosure.

FIG. 2 illustrates a method 200 of operation of the multimedia system 100 of FIG. 1 in accordance with at least one embodiment of the present disclosure. At block 202, the content processing/storage module 116 identifies the one or more multimedia streams from the multimedia sources 106-112 that are available for selection at the multimedia receiver 102. The content processing/storage module 116 then provides a representation of the available multimedia streams for display on the display device 104 so as to facilitate a user's selection of one of the available multimedia streams. As discussed in greater detail below with reference to FIGS. 7 and 8, the available multimedia streams can be made available for selection via an array display of graphical representations of the visual content of at least a subset of the available multimedia streams or via display of an electronic (or "enhanced") programming guide (EPG) or other listing of available multimedia streams.

At block 204, the user can manipulate one or more button features of the remote control device 128 (or alternately a button panel interface on the multimedia receiver 102) to generate user input 126 that directs the multimedia receiver 102 to select a particular multimedia stream. The selection of the multimedia stream can include directing the multimedia receiver 102 to initiate display of the multimedia stream, or the selection of the multimedia stream can include a temporary selection of a graphical representation of the multimedia stream from a displayed array or from an EPG or other displayed listing.

In response to the user's selection of an available multimedia stream, at block 206 the content processing/storage module 116 provides information regarding the selected multimedia stream to the trickplay controller 118. This information can include, for example, metadata embedded in the selected multimedia stream, information regarding the encoding format or source of the multimedia stream, and the like. From this information, the trickplay controller 118 determines the availability of one or more trickplay features for the selected multimedia stream as described above, and provides one or more controllability indicators 130 based on the determined availability to the display controller 122.

At block 208, the display controller 122 determines which, if any, visual indicators 132 to overlay the display content being provided to the display device 104 based on the one or more received controllability indicators. If one or more visual indicators 132 are to be provided, the display controller 122 generates an overlay layer having the visual indicators 132 and then provides the display content and the overlay layer (e.g., as a combined video layer via blending) to the display device 104 for display. As noted above, the selection of an available multimedia stream can include the temporary selection of a graphical representation of the multimedia stream from a plurality of graphical representations of multimedia streams, and thus the display content with which the visual indicator 132 is provided may not be video content from the selected multimedia stream but instead EPG content, video content from another multimedia stream, etc.

The display of a visual indicator 132 can occur briefly or for an extended duration. To illustrate, in the event that a visual indicator 132 is to be provided when a particular trickplay feature is unavailable, the visual indicator 132 can be displayed for a brief period (e.g., five seconds) so as to initially inform the user that the trickplay feature is unavailable for the selected multimedia content channel. Alternately, the visual indicator 132 can be displayed for the duration that the multimedia content channel is selected or provided for display. To illustrate, for display of a visual indicator 132 based on selection of a multimedia channel during display of an EPG, the visual indicator 132 can be displayed for a brief period or displayed as long as the EPG program selection feature remains on the selected multimedia stream. Similarly, if the selection of the multimedia content channel results in the display of its video content (e.g., as a normal presentation), the visual indicator 132 can be displayed for only a brief period at the start of the presentation of the video content or for the duration of the presentation of the video content (or for at least the portion of the video content for which the trickplay availability indicated by the visual indicator 132 is valid).

Figure 3:
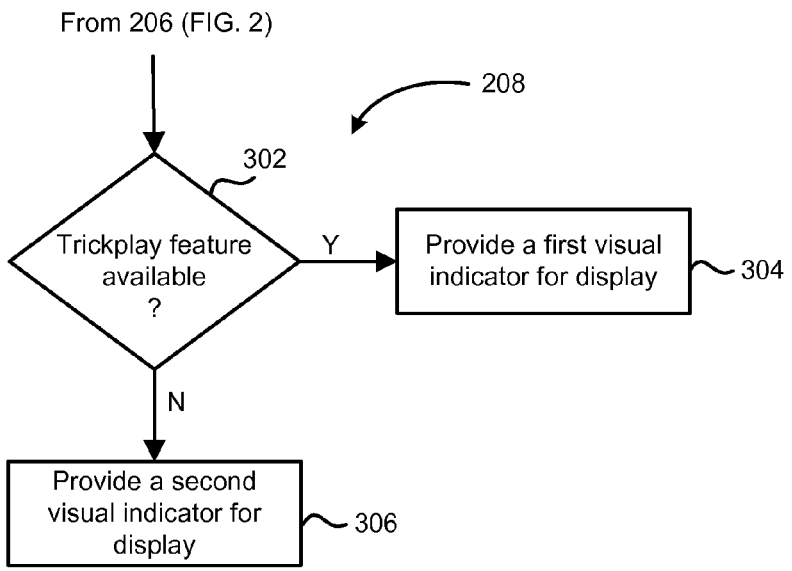
FIG. 3 is a flow diagram illustrating an example implementation of the method of FIG. 2 in accordance with at least one embodiment of the present disclosure.

FIG. 3 illustrates a particular implementation of the process performed at block 208 of method 200 of FIG. 2 in accordance with at least one embodiment of the present disclosure. In the implementation of FIG. 3, one visual indicator 132 is provided to indicate an availability of a trickplay feature or a different visual indicator 132 is provided to indicate an unavailability of the trickplay feature in response to selection of the multimedia stream. At block 302, the trickplay feature is identified as either available or unavailable. If the trickplay feature is available, at block 304 the display controller 122 provides a first visual indicator for display. Otherwise, if the trickplay feature is unavailable, at block 306 the display controller 122 provides a second visual indicator for display, where the second visual indicator visually differs from the first visual indicator in a manner that conveys the availability status of the trickplay feature to a user. To illustrate, the first visual indicator can have a green coloration (thereby indicating trickplay availability) and the second visual indicator can have a red coloration (thereby indicating trickplay unavailability). Other possible distinctions between the first and second visual indicators include, but are not limited to, luminosity, degree of transparency, size, shape, shading, location, position, orientation, and the like.

Figure 4:
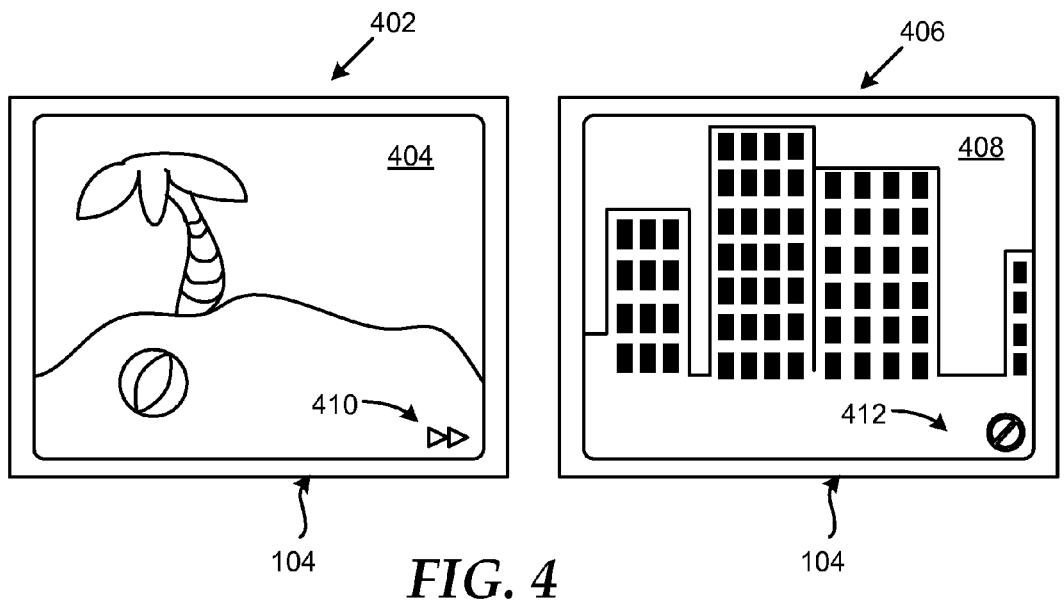
FIG. 4 is a diagram illustrating the display of visual indicators in the example implementation of FIG. 3 in accordance with at least one embodiment of the present disclosure.

FIG. 4 is a diagram illustrating an example process of selectively providing a visual indicator in accordance with the implementation of FIG. 3 in accordance with at least one embodiment of the present disclosure. In the depicted example, a display 402 of the multimedia content 404 of a first multimedia stream and a display 406 of the multimedia content 408 of a second multimedia stream at the display device 104 are shown. For this example, it is assumed that the fast forward trickplay feature is available for the first multimedia stream and unavailable for the second multimedia stream. Accordingly, the display 402 can include, for example, a visual indicator 410 in the form of a "fast forward" symbol, thereby conveying to the user that the fast forward trickplay feature is available. In contrast the display 404 can include, for example, a visual indicator in the form of a "ban" or "no" symbol, thereby conveying to the user that the fast forward trickplay feature is unavailable. As noted above, other visual characteristics, such as color, intensity, pattern, shape, and the like can be used to signal either an availability or unavailability of one or more trickplay features.

Figure 5:
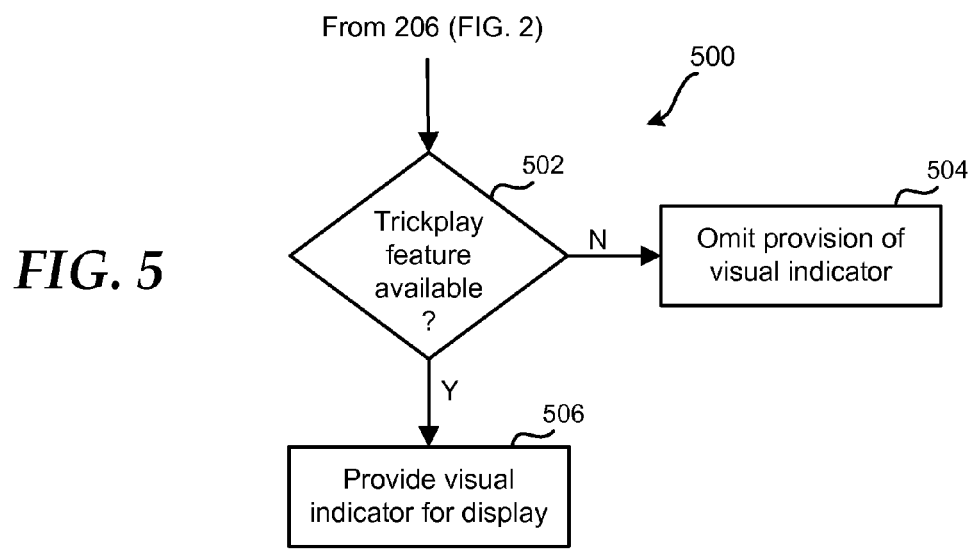
FIG. 5 is a flow diagram illustrating another example implementation of the method of FIG. 2 in accordance with at least one embodiment of the present disclosure.

FIG. 5 illustrates another example implementation of the process performed at block 208 of method 200 of FIG. 2 in accordance with at least one embodiment of the present disclosure. In the implementation of FIG. 4, a visual indicator 132 is provided to indicate an unavailability of a trickplay feature or display of a visual indicator 132 is omitted to indicate an availability of the trickplay feature in response to selection of the multimedia stream. At block 502, the trickplay feature is identified as either available or unavailable for a multimedia stream in response to its selection from a plurality of available multimedia streams. If the trickplay feature is unavailable, at block 504 the display controller 122 provides a visual indicator 132 for display so as to indicate to the user that the trickplay feature is unavailable for the selected multimedia stream. Otherwise, if the trickplay feature is available, at block 506 the display controller 122 omits provision of the visual indicator 132 for display, whereby the absence of the displayed visual indicator informs the user that the trickplay feature is available. In an alternate embodiment, a visual indicator 132 can be provided for display to indicate an availability of the trickplay feature and display of the visual indicator 132 can be omitted to indicate an unavailability of the trickplay feature.

Figure 6:
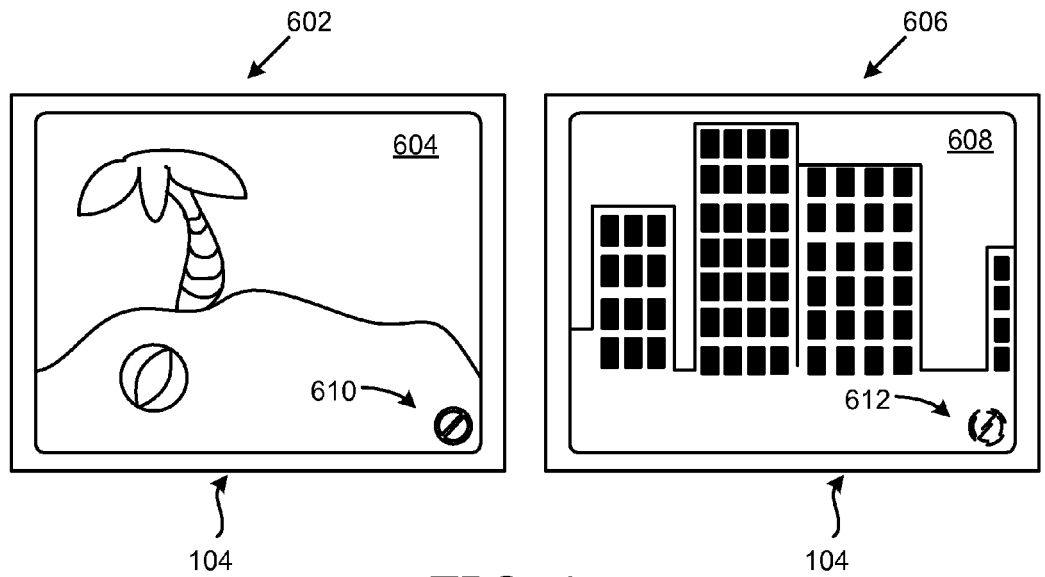
FIG. 6 is a diagram illustrating the display of visual indicators in the example implementation of FIG. 5 in accordance with at least one embodiment of the present disclosure.

FIG. 6 is a diagram illustrating an example process of selectively providing a visual indicator in accordance with the implementation of FIG. 5 in accordance with at least one embodiment of the present disclosure. In the depicted example, a display 602 of the multimedia content 604 of a first multimedia stream and a display 606 of the multimedia content 608 of a second multimedia stream at the display device 104 are shown. For this example, it is assumed that a certain trickplay feature is unavailable for the first multimedia stream and available for the second multimedia stream. Accordingly, the display 602 can include, for example, a visual indicator 610 in the form of a "ban" or "no" symbol, thereby conveying to the user that the trickplay feature is unavailable in response to the user's selection of the first multimedia stream. In contrast, the display 604 does not include a visual indicator (the absence of a visual indicator is represented by dashed lines 612 in the outline of the "ban" symbol), thereby conveying to the user that the user can implement the trickplay feature for the second multimedia stream if the user so elects.

Figure 7:
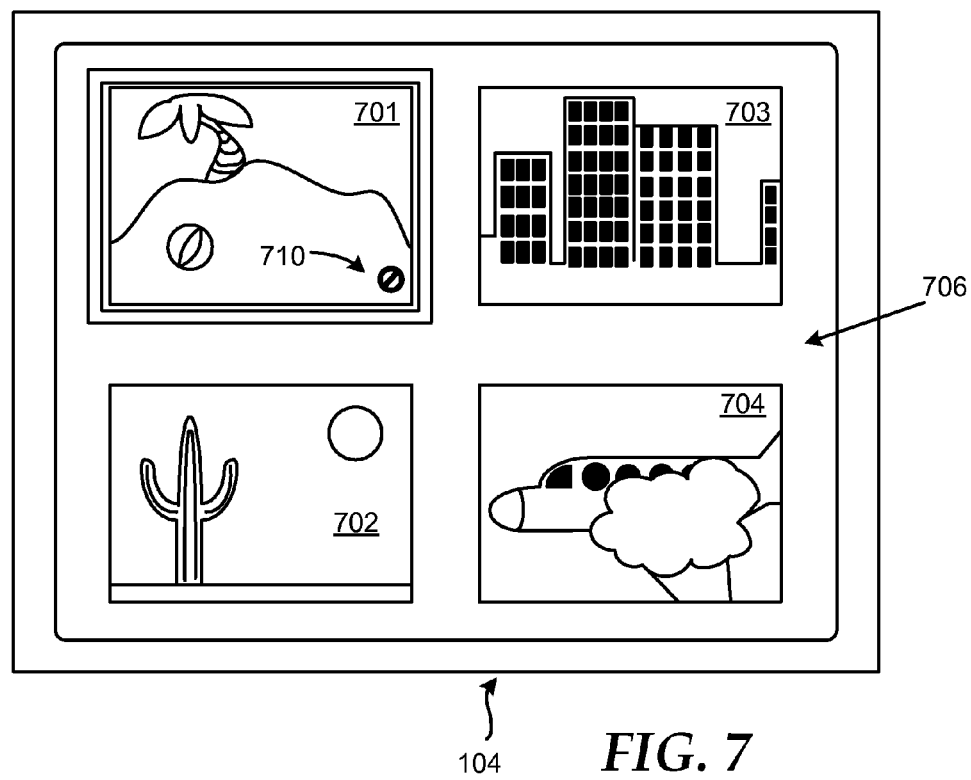
FIG. 7 is a diagram illustrating an example technique for an arrayed display of graphical representations of the plurality of multimedia streams in accordance with at least one embodiment of the present disclosure.

FIG. 7 illustrates an example technique for selecting a multimedia stream from a plurality of multimedia streams available at a multimedia receiver in accordance with at least one embodiment of the present disclosure. In one embodiment, a graphical representation of each of the plurality of available multimedia streams (or a subset thereof) can be displayed in an array (e.g., a mosaic) and the user can at least temporarily select one of the plurality of available multimedia streams by manipulating a selection mechanism to focus on the graphical representation associated with the multimedia stream. To illustrate, graphical representations 701-704 can be provided for concurrent display in an array 706 on the display device 104 for four multimedia streams available for selection at the multimedia receiver 102 (FIG. 1), whereby the graphical representations 701-704 can include still image captures of the multimedia content of the corresponding multimedia stream, video clips of the multimedia content of the corresponding multimedia stream, or combinations thereof. The user can navigate a highlight feature 708 to the graphical representation (e.g., graphical representation 701) of a desired multimedia stream, in response to which a visual indicator 710 can be provided for display based on the availability of one or more trickplay features for the selected multimedia stream. The visual indicator 710 can be displayed within the area of the selected graphical representation, proximate to a border of the selected graphical representation, or in a predetermined location of the display of the display device 104 (e.g., the bottom right corner of the display). The highlight feature 708 can be in the form of a border of a certain color or luminosity, a change in the color, luminosity, or transparency of the selected graphical representation, the presence of a symbol on or near the selected graphical representation, and the like.

In addition to, or instead of, determining and providing for display a visual indicator of the availability of a trickplay feature for a multimedia stream in response to its selection by a user, in one embodiment, the multimedia receiver 102 can provide a visual indicator of the availability of one or more trickplay features for some or all of the multimedia streams represented in the array 706. The multimedia receiver 102 can determine the availability of a trickplay feature for each of the four multimedia streams represented by graphical representations 701-704 and then selectively provide a visual indicator for display in association with the corresponding graphical representation. To illustrate, in the example of FIG. 7 the trickplay feature is available for the second, third, and fourth multimedia streams (corresponding to graphical representations 702-704) and is unavailable for the first multimedia stream (corresponding to the graphical representation 701). Accordingly, the multimedia receiver 102 can provide the visual indicator 710 in the form of a "ban" or "no" symbol in association with the graphical representation 701 and omit provision of the "ban" or "no" symbol for the graphical representations 702-704.

Figure 8:
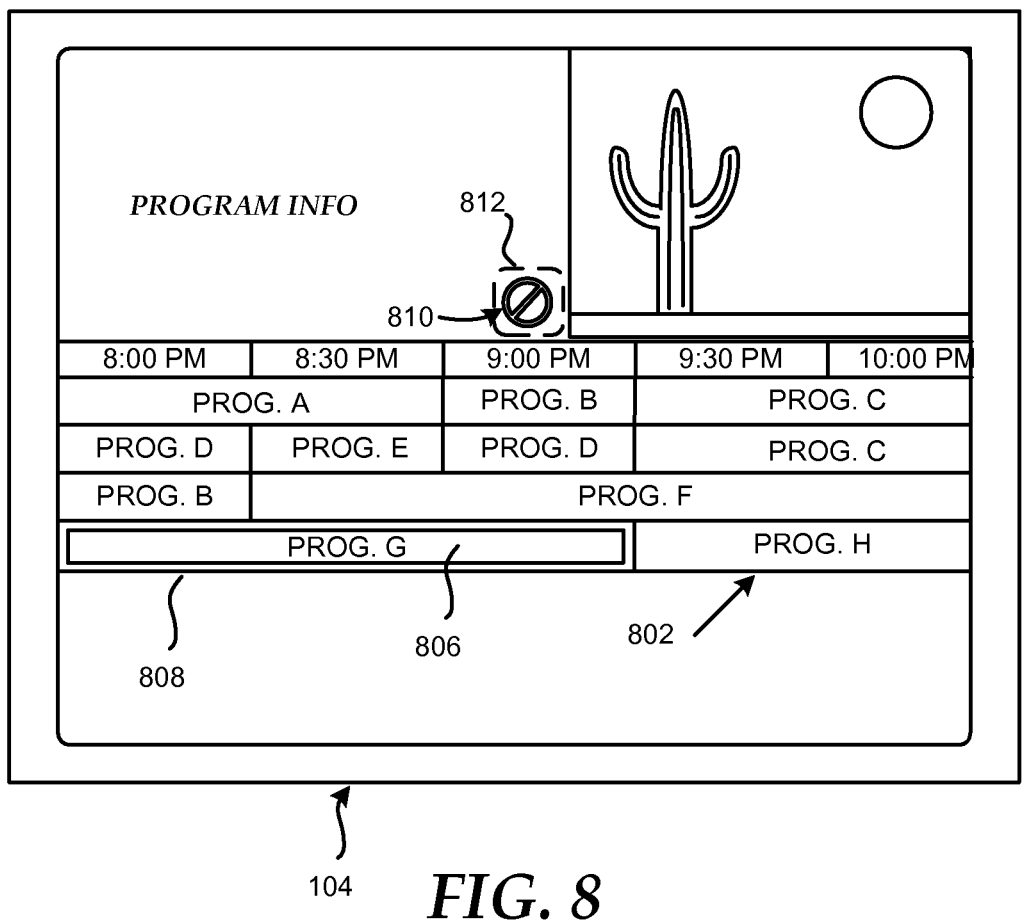
FIG. 8 is a diagram illustrating an example technique for an electronic program guide (EPG)-type listing of the plurality of multimedia streams in accordance with at least one embodiment of the present disclosure.

FIG. 8 illustrates another example technique for selecting a multimedia stream from a plurality of multimedia streams available at a multimedia receiver in accordance with at least one embodiment of the present disclosure. In one embodiment, each of the plurality of available multimedia streams (or a subset thereof) is represented in a listing, such as a displayed EPG, whereby the user can at least temporarily select one of the plurality of available multimedia streams by manipulating a selection mechanism to focus on the graphical representation associated with the multimedia stream within the listing. In the depicted example of FIG. 8, each of the available multimedia streams is represented in an EPG 802 as a listing entry based on channel number or other channel/source identifier, time (for non-on-demand content), etc. Each listing entry can include, for example, a name or title, a description, a rating, etc. The user can navigate a highlight feature 808 to the listing entry (e.g., listing entry 806) of a desired multimedia stream, in response to which a visual indicator 810 can be provided for display based on the availability of one or more trickplay features for the selected multimedia stream. The visual indicator 810 can be displayed within the area of the selected listing entry, proximate to a border of the selected listing entry, or in a predetermined location 812 of the EPG 802. As with the highlight feature 708 of FIG. 7, the highlight feature 808 can be in the form of a border of a certain color or luminosity, a change in the color, luminosity, or transparency of the selected listing entry, the presence of a symbol on or near the selected listing entry, and the like.

Figure 9:
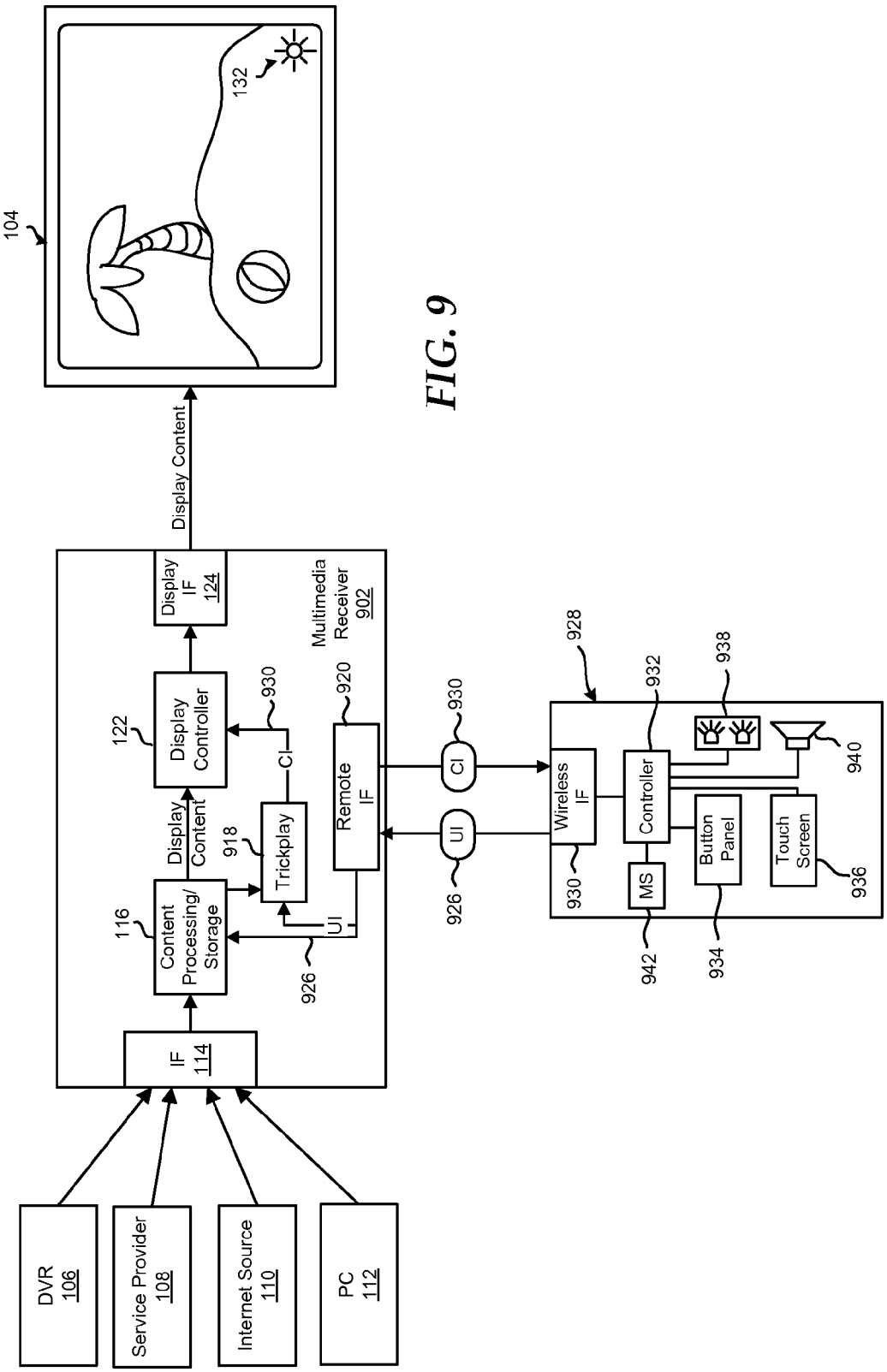
FIG. 9 is a block diagram illustrating a multimedia system having a remote control device configured to provide an indication of availability of one or more trickplay features in accordance with at least one embodiment of the present disclosure.

FIG. 9 illustrates an example multimedia system 900 configured to provide an indication of an availability of one or more trickplay features via a remote control device in accordance with at least one embodiment of the present disclosure. The multimedia system 900 includes a multimedia receiver 902 and the display device 104 at a user's premises, and one or more local or remote multimedia sources of multimedia streams, such as multimedia sources 106-112. As with the multimedia receiver 102 of FIG. 1, the depicted multimedia receiver 902 includes the source interface 114, the content processing/storage module 116, and the display interface 124. The multimedia receiver 102 further includes a trickplay controller 918 (corresponding to the trickplay controller 118, FIG. 1) and a remote control interface 920 (corresponding to the remote control interface 120, FIG. 1) to interface with a remote control device 928. The multimedia receiver 920 further can include the display controller 122 of FIG. 1, which is omitted in FIG. 9 for ease of discussion.

As described above, the source interface 114 is configured to receive multimedia streams from some or all of the multimedia sources 106-112 and the content processing/storage module 116 is configured to select and process one or more of the received multimedia streams, along with additional content (e.g., an EPG), for display at the display device 104 via the display controller 124. The remote interface 920 is configured to receive user input 926 from the remote control device 928 or other input source. Further, the remote interface 920 includes a transmitter to transmit information to the remote control device 928, including one or more controllability indicators 930 as described below. The transmitter of the remote interface 920 can include a wireless transmitter, such an infrared or RF transmitter.

Similar to the trickplay controller 118 of FIG. 1, the trickplay controller 918 is configured to determine the availability of one or more identified trickplay features for a multimedia stream selected based on user input 926 received from the remote control device 928 or from another input, and then provide, via the remote interface 920, one or more controllability indicators 930 to the remote control device 928 based on the availability of the one or more identified trickplay features. The controllability indicator 930 represents the availability of the corresponding trickplay feature for the multimedia stream selected or displayed. A single controllability indicator 930 can be sent for all of the trickplay features being analyzed, or a separate controllability indicator 930 can be sent for each trickplay feature. The trickplay controller 918 further can provide the one or more controllability indicators 930 to the display controller 122 (not shown in FIG. 9) for the selective display of one or more visual indicators 132 on the display device 104 as described above.

In one embodiment, the remote control device 928 includes a wireless interface 930, a control module 932 (e.g., a microcontroller, a hardware-based state controller, a processor and software, etc.) and a button panel 934. The wireless interface 930 can include a RF interface (e.g., an IEEE 802.11 interface, a Bluetooth™ interface, etc.), an infrared interface, etc. The remote control device 928 further can include means for rendering a trickplay indicator so as to convey to the user the availability status of one or more trickplay features. These means can include one or more of a touch screen 936 or other display screen, a light emitting diode (LED) bank 938 of one or more LEDs or other light sources, a speaker 940, and the like. In one embodiment, part or all of the button panel 934 is implemented as soft buttons at the touch screen 936. Additionally, the remote control device 928 can include a motion sensor to detect motion of the remote control device 928, whereby a detected motion can trigger the remote control device 928 to redisplay a visual indicator or again output an audible indicator of the availability of one or more trickplay features. The motion sensor 942 can include, for example, an inertial sensor, a light sensor, and the like.

Figure 10:
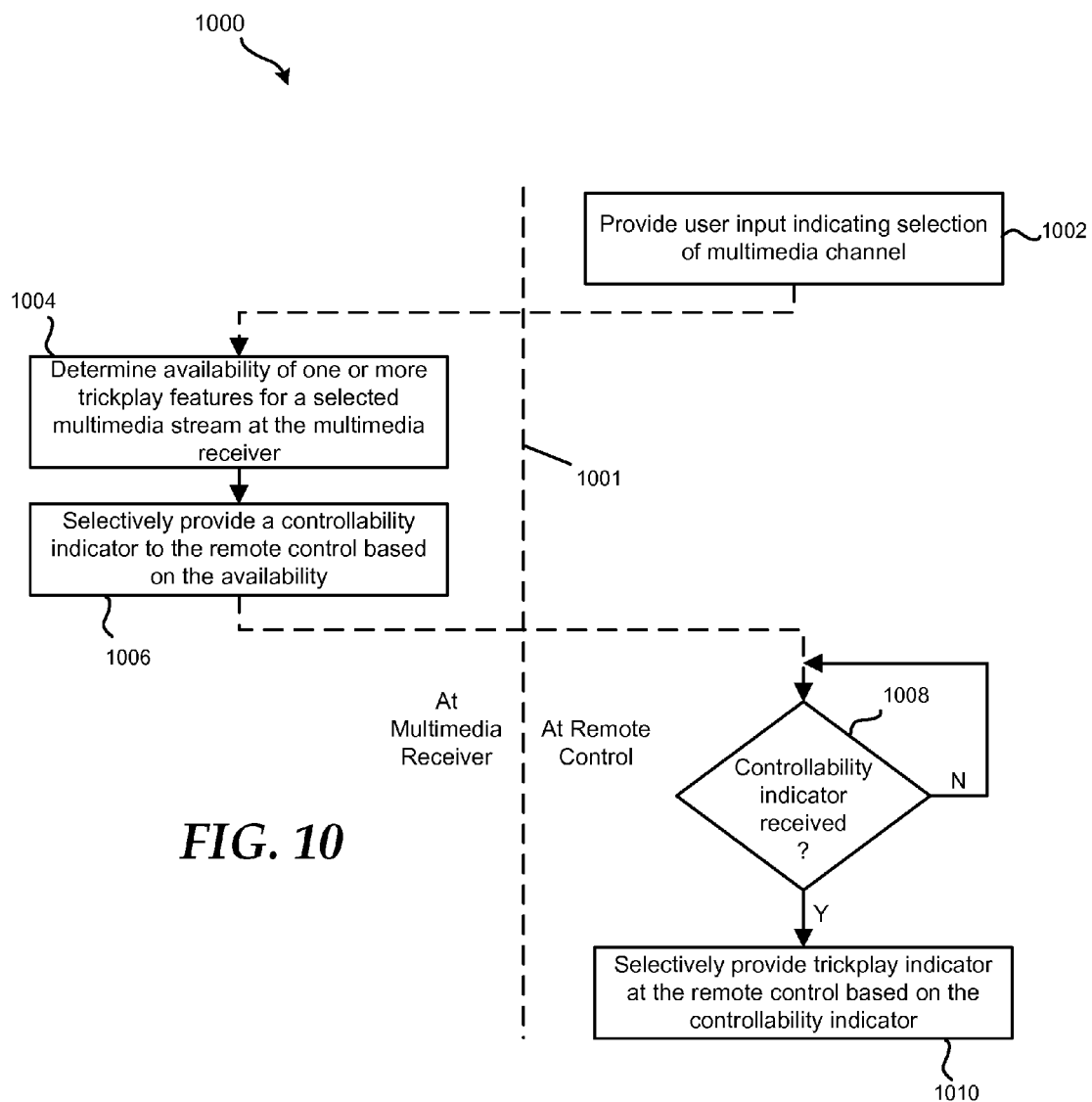
FIG. 10 is a flow diagram illustrating a method for providing an indication of availability of one or more trickplay features via a remote control device in accordance with at least one embodiment of the present disclosure.

FIG. 10 illustrates a method 1000 of an example operation of the multimedia system 900 of FIG. 9 in accordance with at least one embodiment of the present disclosure. For purposes of this example, those processes represented by blocks to the left of dashed line 1001 are performed at the multimedia receiver 102 and those processes represented by blocks to the right of the dashed line 1001 are performed at the remote control device 928.

At block 1002, the user manipulates the one or more button features (e.g., push buttons, switches, arrow pad, soft keys, etc.) of the button panel 934 of the remote control device 928 to send the user input 926 to the multimedia receiver 902, whereby the user input 926 can include user input indicating selection of a particular multimedia stream. At block 1004, the trickplay controller 918 of the multimedia receiver 902 determines the availability status of one or more trickplay features of the selected multimedia stream. At block 1006, the trickplay controller 918 selectively provides, via the remote control interface 920, one or more controllability indicators 930 to the remote control device 928 based on the availability of the trickplay features.

At block 1008, the control module 932 of the remote control device 928 determines whether any controllability indicator 930 has been received. If so, at block 1010 the control module 932 processes the one or more controllability indicators 930 and manipulates one or more output devices (e.g., the LED bank 938, the speaker 940, and the touch screen 936) so as to provide to the user an indicator of the availability of the corresponding trickplay feature for the selected multimedia stream.

To illustrate, the LED bank 938 can include an LED associated with one or more trickplay features and the control module 932 can activate or deactivate the LED based on the availability of the corresponding trickplay feature. For example, the LED bank 938 could include a single LED associated with trickplay whereby the LED is activated when trickplay is available for the selected multimedia stream is available and deactivated when trickplay is not available (or vice versa). The activation of an LED can include maintaining the LED in an active state if already activated, and the deactivation of an LED can include maintaining the LED in an inactive state if already deactivated. As another example, the LED bank 938 could include a LED for each of a number of trickplay features, whereby the LED is located proximal to the button of the button panel 934 associated with the trickplay feature or the LED serves as a backlighting source for the button associated with the trickplay feature. The LED for a given trickplay feature therefore could be activated or deactivated based on the availability of that trickplay feature. As yet another example, an LED having one output color could be activated to indicate availability of a certain trickplay feature, while an LED having a different output color could be activated to indicate unavailability of the trickplay feature. To illustrate, the button associated with the trickplay feature (e.g., the fast forward button) could be implemented with transparent or translucent material so that the button glows different colors depending on availability of the trickplay feature. The provision of a visual indicator of the availability of a trickplay feature via one or more LEDs can be initiated in response to a user's manipulation of a button feature that is associated with the trickplay feature. An illustrative use of an LED to provide a visual indicator is described in greater detail below with reference to FIG. 13.

Rather than, or in addition to, the use of LEDs or other light sources to provide a visual indicator of trickplay availability, the control module 932 can play a certain sound via the speaker 940 so as to provide an audible indicator of the availability of the trickplay feature to the user. The sound can be automatically played in response to receiving the corresponding controllability indicator 930, or the sound can be played in response to the user's selection of the button associated with the trickplay feature. To illustrate, assuming that a controllability indicator 930 indicates that a slow reverse feature is unavailable for a multimedia stream being presented, the control module 932 can control the speaker 940 to play a certain audible notifier whenever the user selects the slow reverse button in the button panel 934 while the multimedia stream is being presented.

Further, in one embodiment, certain trickplay features may be implemented as soft buttons at the touch screen 936 of the remote control device 928. Thus, the control module 932 can provide a visual indicator of trickplay availability to a user by configuring the touch screen 936 so as to manipulate the appearance of these soft buttons based on the availability of the corresponding trickplay features. To illustrate, when a controllability indicator 930 indicates a corresponding trickplay feature is available, the control module 932 can manipulate the touch screen 936 so as to display the soft button for the trickplay feature. Conversely, when the trickplay feature is unavailable, the control module 932 can manipulate the touch screen 936 so as to omit display of the soft button for the trickplay feature. An example of a soft button-based indicator is described in greater detail below with reference to FIGS. 13 and 14.

In one embodiment, the remote control device 928 can be configured to provide one or more audible or visual indicators either temporarily following the selection of a multimedia stream or following a user's manipulation of a button feature associated with the trickplay feature or by providing the one or more indicators for most or all of the duration of the presentation of the multimedia stream (or the duration of its selection focus). The temporary provision of an audible/visual indicator can reduce power consumption and minimize intrusion into the user's viewing experience. However, as the presentation of the multimedia content channel progresses, the user may forget about the availability status of trickplay features and thus may attempt to enact unavailable trickplay features, to the consternation of the user.

To help ensure that the user remains aware of the availability status of trickplay features for a multimedia stream selected/presented, the control module 932 uses the sudden motion of the remote control device 928 as detected by the motion sensor 942 to reinitiate provision of the trickplay indicator. Such sudden motion often results from a user picking up the remote control device 928 or from the user rotating or moving the remote control device 928 in preparation for use of the remote control device 928. Such motion therefore can represent an appropriate point to remind the user of the availability status of one or more trickplay features. This motion-initiated process is described in greater detail below with reference to FIG. 16.

Figure 11:
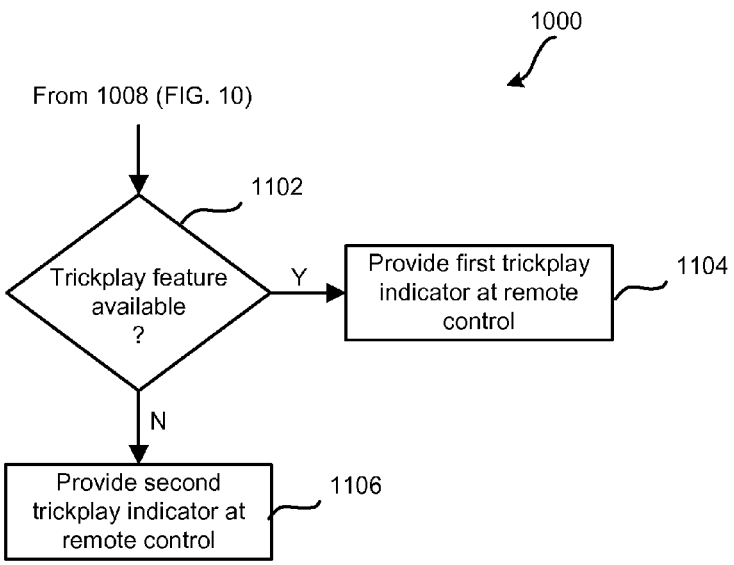
FIG. 11 is a flow diagram illustrating an example implementation of the method of FIG. 10 in accordance with at least one embodiment of the present disclosure.

FIG. 11 illustrates a particular implementation of the process performed at block 1010 of method 1000 of FIG. 10 in accordance with at least one embodiment of the present disclosure. In the implementation of FIG. 11, one trickplay indicator is provided via the remote control device 928 (FIG. 9) to indicate an availability of a trickplay feature and different trickplay indicator is provided via the remote control device 928 to indicate an unavailability of the trickplay feature for a multimedia stream in response to its selection. At block 1102, the trickplay feature is identified as either available or unavailable. If the trickplay feature is available, at block 1104 the control module 932 manipulates the LED bank 938, the speaker 940, the touch screen 936, or a combination thereof, to provide a first trickplay indicator. Otherwise, if the trickplay feature is unavailable, at block 1106 the control module 932 manipulates the LED bank 938, the speaker 940, the touch screen 936, or a combination thereof, to provide a second trickplay indicator, where the second trickplay indicator differs from the first trickplay indicator in a manner that conveys the availability status of the trickplay feature to a user. To illustrate, the first trickplay indicator can be the activation of a blue LED and the second trickplay indicator can be the activation of a red LED. Further, the first trickplay indicator can be a different indicator type than the indicator type of the second trickplay indicator. For example, the first trickplay indicator can be the activation of an LED and the second trickplay indicator can be the playing of a particular sound.

Figure 12:
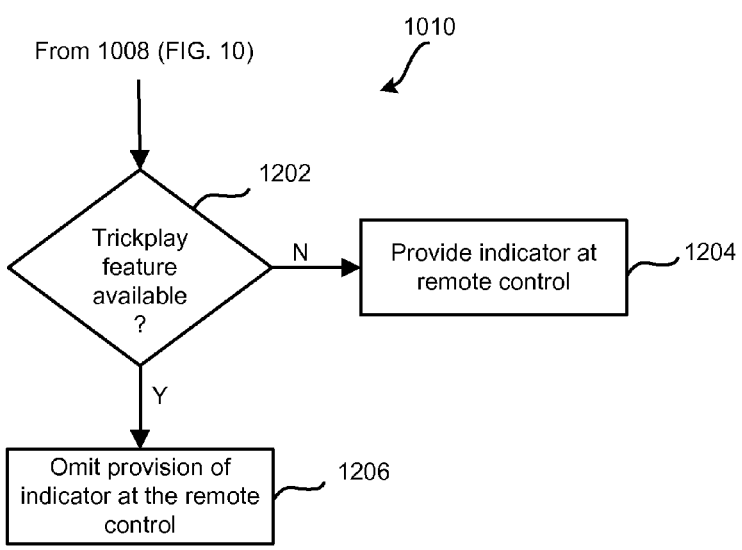
FIG. 12 is a flow diagram illustrating another example implementation of the method of FIG. 10 in accordance with at least one embodiment of the present disclosure.

FIG. 12 illustrates another example implementation of the process performed at block 1010 of method 1000 of FIG. 10 in accordance with at least one embodiment of the present disclosure. In the implementation of FIG. 12, a trickplay indicator is provided via the remote control device 928 (FIG. 9) to indicate the trickplay feature is unavailable or provision of a trickplay indicator via the remote control device 928 is omitted to indicate the trickplay feature is available. At block 1202, the trickplay feature is identified as either available or unavailable for a multimedia stream. If the trickplay feature is unavailable, at block 1204 the control module 932 manipulates the LED bank 938, the speaker 940, the touch screen 936, or a combination thereof, to provide a trickplay indicator. Otherwise, if the trickplay feature is available, at block 1206 control module 932 refrains from manipulating other components of the remote control device 928 so as to omit provision of the trickplay feature, whereby the absence of the provision of the trickplay indicator indicates to the user that the trickplay feature is available. In an alternate embodiment, a trickplay indicator can be provided at the remote control device 928 to indicate the trickplay feature is available and provision of the trickplay indicator can be omitted at the remote control device 928 to indicate the trickplay feature is unavailable.

Figure 13:
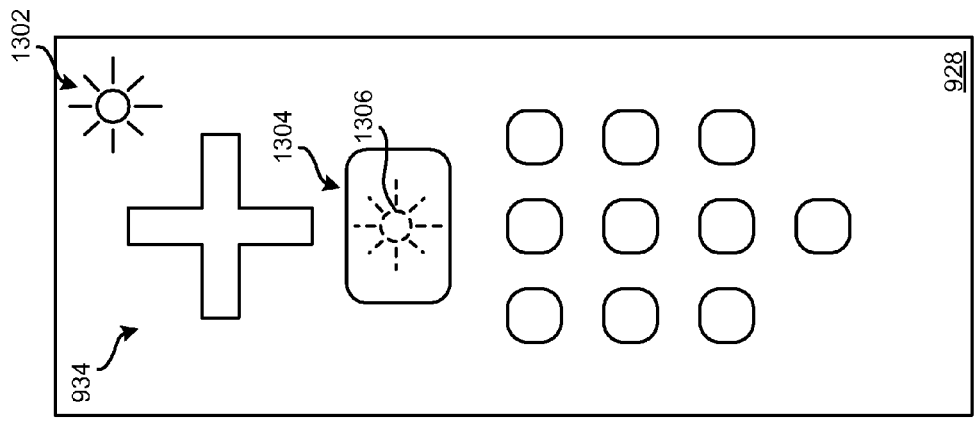
FIG. 13 is a diagram illustrating a remote control device configured to provide a visual indication of availability of one or more trickplay features via one or more light sources in accordance with at least one embodiment of the present disclosure.

FIG. 13 illustrates an example implementation whereby a LED or other light source is selectively activated at the remote control device 928 so as to provide to the user an indication of the availability status of a trickplay feature for a multimedia stream being selected/presented in accordance with at least one embodiment of the present disclosure. In the depicted example, the remote control device 928 includes an LED 1302 at a particular location on the face of the button panel 934 of the remote control device 928. The control module 932 (FIG. 9) can selectively activate or deactivate the LED 1302 so as to provide to the user an indication of trickplay features. In another embodiment, the button panel 934 includes a trickplay button 1304 (e.g., a skip button) configured such that the corresponding trickplay command is generated at the wireless interface 936 in response to the manipulation of the trickplay button 1304 by the user. The trickplay button 1304 can include one or more LEDs 1306 located in proximity to the trickplay button 1304 (or underneath a transparent or translucent cover for the trickplay button 1304). In this instance, the control module 932 can selectively activate the LED 1306 to indicate whether the particular trickplay feature associated with the trickplay button 1304 is available. In the case of two or more LEDs 1306 for the trickplay button 1304, each with a different color, the LED 1306 having the appropriate color for the availability status of the trickplay feature can be activated to convey the availability status of the trickplay feature to the user.

Figure 15:
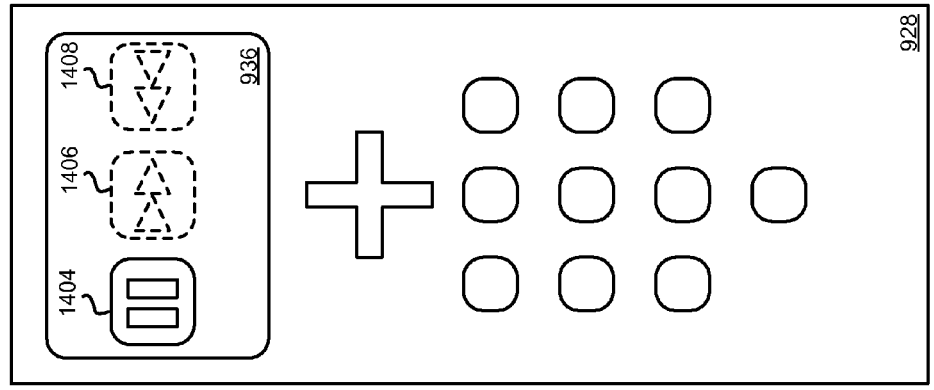
FIGS. 14 and 15 are diagrams illustrating a remote control device configured to provide a visual indication of availability of one or more trickplay features via one or more soft buttons of a touch screen in accordance with at least one embodiment of the present disclosure.
Figure 14:
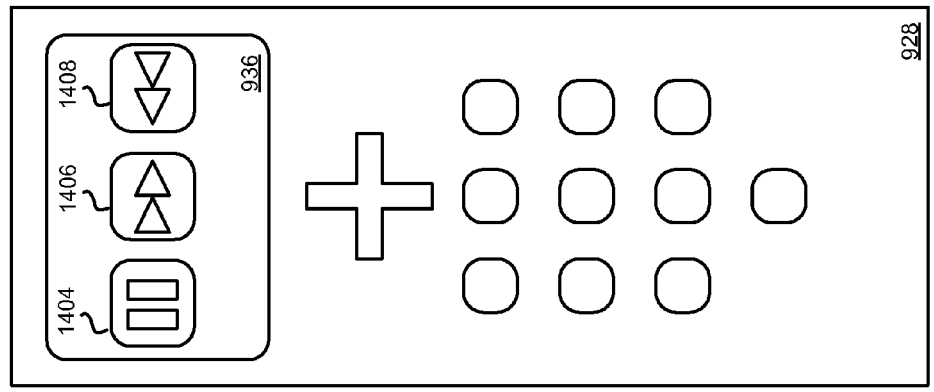

FIGS. 14 and 15 illustrate another example implementation whereby soft buttons of the touch screen 936 of the remote control device 928 are selectively manipulated so as to provide to the user an indication of the availability status of a trickplay feature for a multimedia stream being selected/presented in accordance with at least one embodiment of the present disclosure. In the depicted example, the touch screen 936 includes soft buttons 1404, 1406, and 1408 corresponding to certain trickplay features (e.g., pause, fast-forward, and fast-rewind, respectively). The control module 932 (FIG. 9) can manipulate the touch screen 936 to selectively display the soft buttons 1404, 1406, and 1408 based on the availability status of the corresponding trickplay features for the multimedia stream. To illustrate, in FIG. 14 controllability indicators 930 (FIG. 9) received at the remote control device 928 indicate that each of the pause, fast-forward, and fast-reverse trickplay features are available and thus each of the soft buttons 1404, 1406, and 1408 is enabled at the touch screen 936. However, in FIG. 15 the controllability indicators 930 received at the remote control device 928 indicate that only the pause trickplay feature is available and thus only the soft button 1404 is activated at the touch screen 936 (the omission of the display of the soft buttons 1406 and 1408 is illustrated by dashed lines for these soft buttons in FIG. 16). Thus, the omission, or deactivation, of the soft buttons 1406 and 1408 would prevent, or at least dissuade, the user from attempting to initiate an unavailable fast-forward or fast-reverse presentation of the content of the multimedia stream.

Although FIGS. 13-15 illustrate examples of visual indicators of trickplay availability at a remote control device, other techniques for providing a visual or audible indicator at a remote control device can be implemented using the guidelines provided herein without departing from the scope of the present disclosure.

Figure 16:
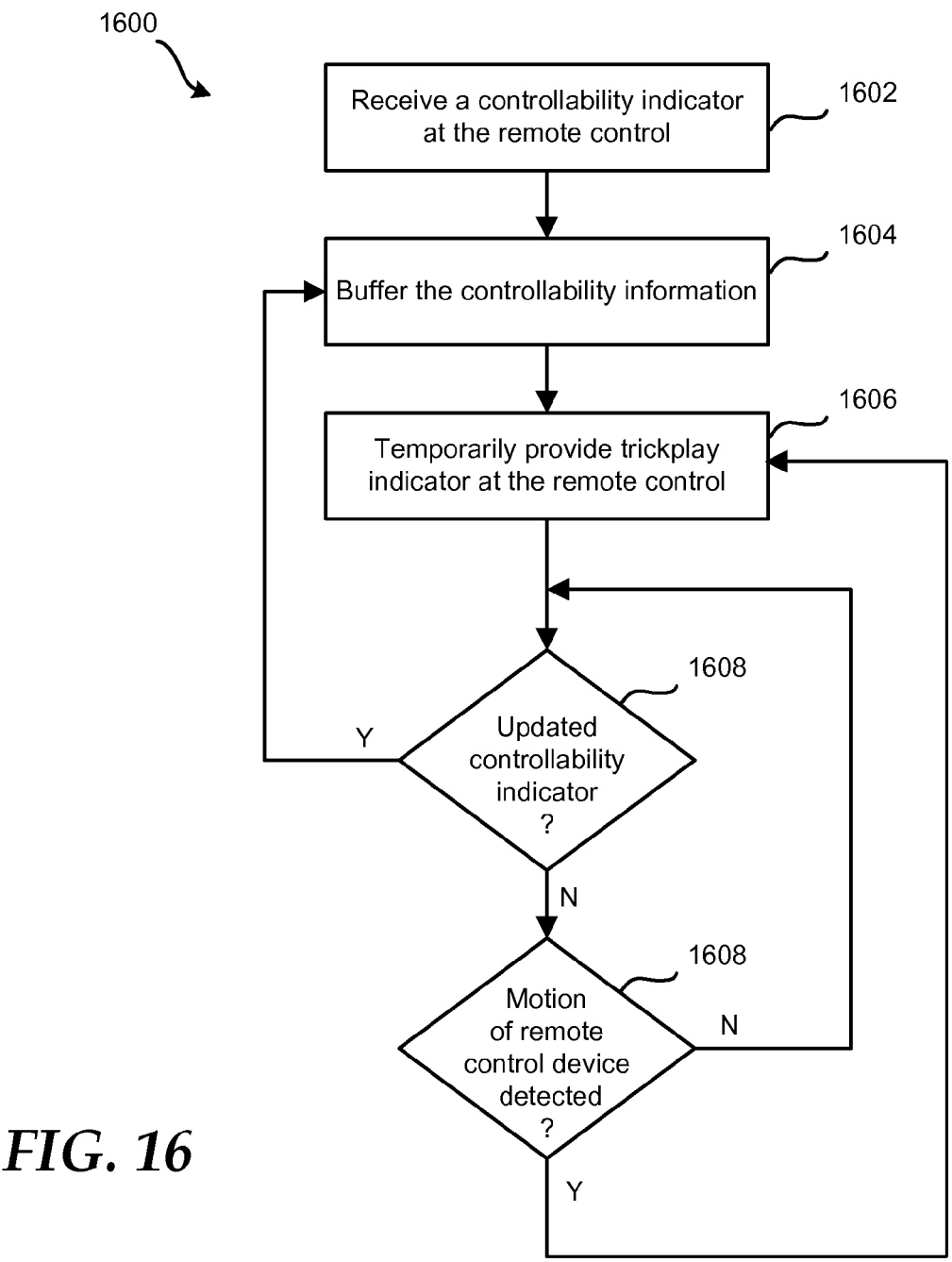
FIG. 16 is a flow diagram illustrating a method for selectively outputting an indicator of availability of one or more trickplay features at a remote control in response to detecting motion of the remote control in accordance with at least one embodiment of the present disclosure.

Referring to FIG. 16, an example method 1600 for initiating provision of an indicator of the availability status of a trickplay feature at the remote control device 928 of FIG. 9 is illustrated in accordance with at least one embodiment of the present disclosure. At block 1602, the remote control device 928 receives a controllability indicator 930 (FIG. 9) representative of the availability status of a corresponding trickplay feature for a multimedia stream being selected/presented. At block 1604 the control module 932 (FIG. 9) of the remote control device 928 buffers the controllability indicator 930 and at block 1606 the control module 932 manipulates one or more of the LED bank 938, the speaker 940, or the touch screen 936 (FIG. 9) to temporarily provide one or more trickplay indicators of the availability status. The provision of the one or more trickplay indicators at the remote control device 928 ends and at block 1608 the remote control device 928 determines if an updated controllability indicator 930 has been received for the trickplay feature (e.g., a new section of the multimedia stream has been presented and has different trickplay availability). If an updated controllability indicator 930 has been received, the method 1600 returns to block 1604 to buffer the updated controllability indicator 930 and process accordingly. Otherwise, at block 1610 the control module 932 waits for the motion sensor 942 (FIG. 9) to detect motion of the remote control device 928. If motion is detected, the method flow returns to block 1606, whereby the control module 932 accesses the buffered controllability indicator 930 and repeats the temporarily provision of one or more indicators of the availability status of the trickplay feature at the remote control device 928 in response to the motion of the remote control device 938. In this way the user can be reminded of the availability status of the trickplay feature for the multimedia stream being selected/processed when the user picks up or moves the remote control device 928 to provide user input.

Figure 17:
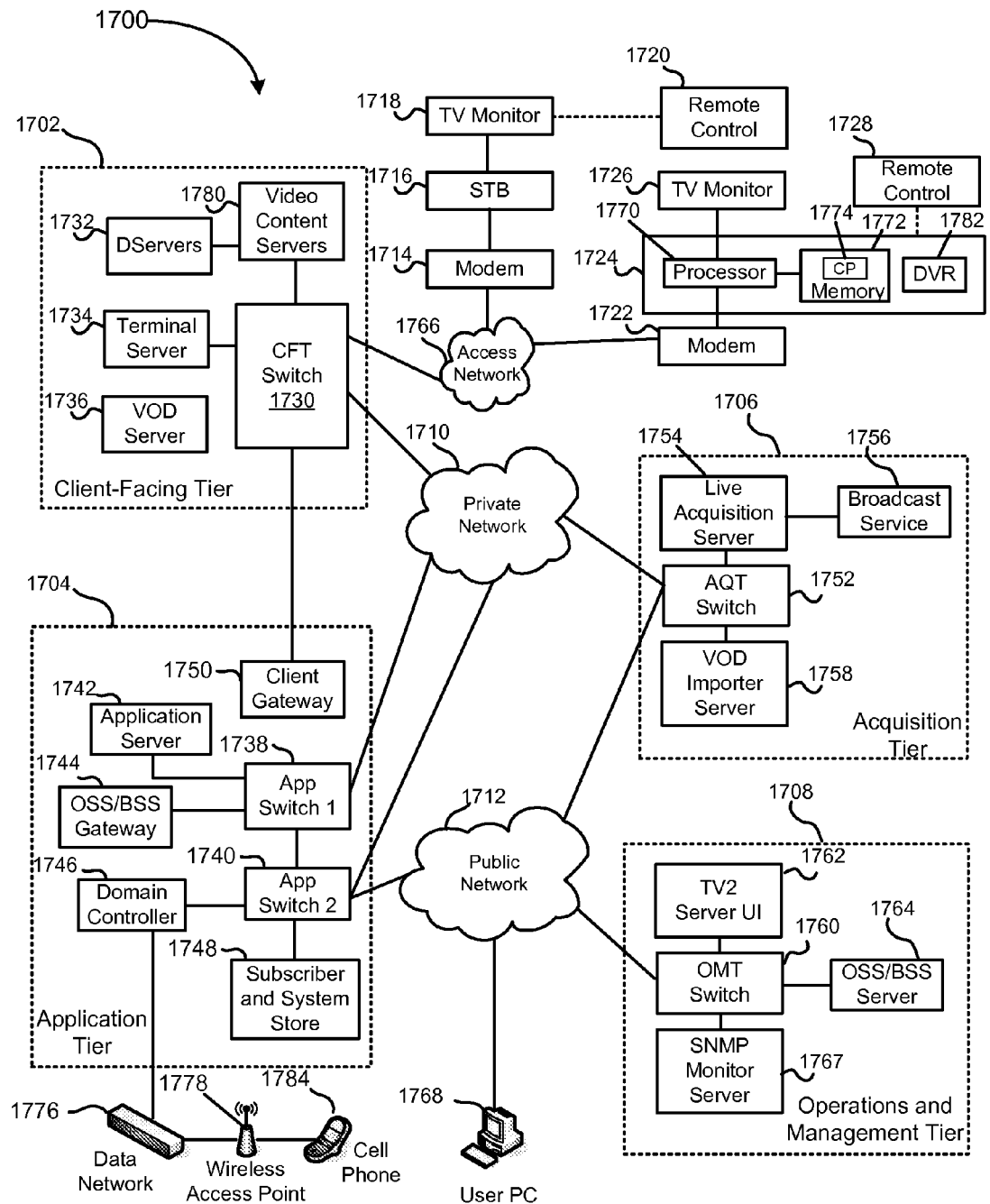
FIG. 17 is a diagram illustrating an example Internet Protocol Television (IPTV) network in which the multimedia systems of FIGS. 1 and 9 can be implemented in accordance with at least one embodiment of the present disclosure.

FIG. 17 shows an IPTV system 1700 including a client facing tier 1702, an application tier 1704, an acquisition tier 1706, and an operations and management tier 1708. Each tier 1702, 1704, 1706, and 1708 is coupled to one or both of a private network 1710 and a public network 1712. For example, the client-facing tier 1702 can be coupled to the private network 1710, while the application tier 1704 can be coupled to the private network 1710 and to the public network 1712 such as the Internet. The acquisition tier 1706 can also be coupled to the private network 1710 and to the public network 1712. Moreover, the operations and management tier 1708 can be coupled to the public network 1712.

The various tiers 1702, 1704, 1706 and 1708 communicate with each other via the private network 1710 and the public network 1712. For instance, the client-facing tier 1702 can communicate with the application tier 1704 and the acquisition tier 1706 via the private network 1710. The application tier 1704 can also communicate with the acquisition tier 1706 via the private network 1710. Further, the application tier 1704 can communicate with the acquisition tier 1706 and the operations and management tier 1708 via the public network 1712. Moreover, the acquisition tier 1706 can communicate with the operations and management tier 1708 via the public network 1712. In a particular embodiment, elements of the application tier 1704 can communicate directly with the client-facing tier 1702.

The client-facing tier 1702 can communicate with user equipment via a private access network 1766, such as an Internet Protocol Television (IPTV) network. In an illustrative embodiment, modems such as a first modem 1714 and a second modem 1722 can be coupled to the private access network 1766. The client-facing tier 1702 can communicate with a first representative set-top box (STB) device 1716 via the first modem 1714 and with a second representative STB device 1724 via the second modem 1722. The STB devices 1716 and 1724 represent implementations of the multimedia receiver 102 of FIG. 1 or the multimedia receiver 902 of FIG. 9. The client-facing tier 1702 can communicate with a large number of set-top boxes over a wide geographic area, such as a regional area, a metropolitan area, a viewing area, or any other suitable geographic area that can be supported by networking the client-facing tier 1702 to numerous set-top box devices. In one embodiment, the client-facing tier 1702 can be coupled to the modems 1714 and 1722 via fiber optic cables. Alternatively, the modems 1714 and 1722 can be digital subscriber line (DSL) modems that are coupled to one or more network nodes via twisted pairs, and the client-facing tier 1702 can be coupled to the network nodes via fiber-optic cables. Each set-top box device 1716 and 1724 can process data received from the private access network 1766 via an IPTV software platform such as Microsoft® TV IPTV Edition.

The first set-top box device 1716 can be coupled to a first display device 1718, such as a first television monitor, and the second set-top box device 1724 can be coupled to a second display device 1726, such as a second television monitor. Moreover, the first set-top box device 1716 can communicate with a first remote control 1720, and the second set-top box device can communicate with a second remote control 1728. In an exemplary, non-limiting embodiment, each set-top box device 1716 and 1724 can receive data or video from the client-facing tier 1702 via the private access network 1766 and render or display the data or video at the display device 1718 or 1726 to which it is coupled. The set-top box devices 1716 and 1724 thus may include tuners that receive and decode television programming information for transmission to the display devices 1718 and 1726. Further, the set-top box devices 1716 and 1724 can include an STB processor 1770 and an STB memory device 1772 that is accessible to the STB processor. In a particular embodiment, the set-top box devices 1716 and 1724 can also communicate commands received from the remote controls 1720 and 1728 back to the client-facing tier 1702 via the private access network 1766.

In an illustrative embodiment, the client-facing tier 1702 can include a client-facing tier (CFT) switch 1730 that manages communication between the client-facing tier 1702 and the private access network 1766 and between the client-facing tier 1702 and the private network 1710. As shown, the CFT switch 1730 is coupled to one or more data servers 1732 that store data transmitted in response to user requests, such as video-on-demand material. The CFT switch 1730 can also be coupled to a terminal server 1734 that provides terminal devices, such as a game application server and other devices with a common connection point to the private network 1710. In a particular embodiment, the CFT switch 1730 can also be coupled to a video-on-demand (VOD) server 1736.

The application tier 1704 can communicate with both the private network 1710 and the public network 1712. In this embodiment, the application tier 1704 can include a first application tier (APP) switch 1738 and a second APP switch 1740. In a particular embodiment, the first APP switch 1738 can be coupled to the second APP switch 1740. The first APP switch 1738 can be coupled to an application server 1742 and to an OSS/BSS gateway 1744. The application server 1742 provides applications to the set-top box devices 1716 and 1724 via the private access network 1766, so the set-top box devices 1716 and 1724 can provide functions such as display, messaging, processing of IPTV data and VOD material. In a particular embodiment, the OSS/BSS gateway 1744 includes operation systems and support (OSS) data, as well as billing systems and support (BSS) data.

The second APP switch 1740 can be coupled to a domain controller 1746 that provides web access, for example, to users via the public network 1712. The second APP switch 1740 can be coupled to a subscriber and system store 1748 that includes account information, such as account information that is associated with users who access the system 1700 via the private network 1710 or the public network 1712. In a particular embodiment, the application tier 1704 can also include a client gateway 1750 that communicates data directly to the client-facing tier 1702. In this embodiment, the client gateway 1750 can be coupled directly to the CFT switch 1730. The client gateway 1750 can provide user access to the private network 1710 and the tiers coupled thereto.

In a particular embodiment, the set-top box devices 1716 and 1724 can access the system via the private access network 1766 using information received from the client gateway 1750. The private access network 1766 provides security for the private network 1710. User devices can access the client gateway 1750 via the private access network 1766, and the client gateway 1750 can allow such devices to access the private network 1710 once the devices are authenticated or verified. Similarly, the client gateway 1750 can prevent unauthorized devices, such as hacker computers or stolen set-top box devices, from accessing the private network 1710 by denying access to these devices beyond the private access network 1766.

For example, when the set-top box device 1716 accesses the system 1700 via the private access network 1766, the client gateway 1750 can verify subscriber information by communicating with the subscriber and system store 1748 via the private network 1710, the first APP switch 1738 and the second APP switch 1740. Further, the client gateway 1750 can verify billing information and status by communicating with the OSS/BSS gateway 1744 via the private network 1710 and the first APP switch 1738. The OSS/BSS gateway 1744 can transmit a query across the first APP switch 1738, to the second APP switch 1740, and the second APP switch 1740 can communicate the query across the public network 1712 to the OSS/BSS server 1764. After the client gateway 1750 confirms subscriber and/or billing information, the client gateway 1750 can allow the set-top box device 1716 access to IPTV content and VOD content. If the client gateway 1750 cannot verify subscriber information for the set-top box device 1716, such as because it is connected to a different twisted pair, the client gateway 1750 can deny transmissions to and from the set-top box device 1716 beyond the private access network 1766.

The acquisition tier 1706 includes an acquisition tier (AQT) switch 1752 that communicates with the private network 1710. The AQT switch 1752 can also communicate with the operations and management tier 1708 via the public network 1712. In a particular embodiment, the AQT switch 1752 can be coupled to a live acquisition server 1754 that receives television content, for example, from a broadcast service 1756. Further, the AQT switch can be coupled to a video-on-demand importer server 1758 that stores television content received at the acquisition tier 1706 and communicate the stored content to the client-facing tier 1702 via the private network 1710.

The operations and management tier 1708 can include an operations and management tier (OMT) switch 1760 that conducts communication between the operations and management tier 1708 and the public network 1712. In the illustrated embodiment, the OMT switch 1760 is coupled to a TV2 server 1762. Additionally, the OMT switch 1760 can be coupled to an OSS/BSS server 1764 and to a simple network management protocol (SNMP) monitor 1767 that monitors network devices. In a particular embodiment, the OMT switch 1760 can communicate with the AQT switch 1752 via the public network 1712.

In a particular embodiment during operation of the IPTV system, the live acquisition server 1754 can acquire television content from the broadcast service 1756. The live acquisition server 1754 in turn can transmit the television content to the AQT switch 1752 and the AQT switch can transmit the television content to the CFT switch 1730 via the private network

1710. Further, the television content can be encoded at the D-servers 1732, and the CFT switch 1730 can communicate the television content to the modems 1714 and 1722 via the private access network 1766. The set-top box devices 1716 and 1724 can receive the television content from the modems 1714 and 1722, decode the television content, and transmit the content to the display devices 1718 and 1726 according to commands from the remote control devices 1720 and 1728.

Additionally, at the acquisition tier 1706, the VOD importer server 1758 can receive content from one or more VOD sources outside the IPTV system 1700, such as movie studios and programmers of non-live content. The VOD importer server 1758 can transmit the VOD content to the AQT switch 1752, and the AQT switch 1752 in turn can communicate the material to the CFT switch 1730 via the private network 1710. The VOD content can be stored at one or more servers, such as the VOD server 1736.

When a user issues a request for VOD content to the set-top box device 1716 or 1724, the request can be transmitted over the private access network 1766 to the VOD server 1736 via the CFT switch 1730. Upon receiving such a request, the VOD server 1736 can retrieve requested VOD content and transmit the content to the set-top box device 1716 or 1724 across the private access network 1766 via the CFT switch 1730. In an illustrative embodiment, the live acquisition server 1754 can transmit the television content to the AQT switch 1752, and the AQT switch 1752 in turn can transmit the television content to the OMT switch 1760 via the public network 1712. In this embodiment, the OMT switch 1760 can transmit the television content to the TV2 server 1762 for display to users accessing the user interface at the TV2 server. For example, a user can access the TV2 server 1762 using a personal computer (PC) 1768 coupled to the public network 1712.

The domain controller 1746 communicates with the public network 1712 via the second APP switch 1740. Additionally, the domain controller 1746 can communicate via the public network 1712 with the PC 1768. For example, the domain controller 1746 can display a web portal via the public network 1712 and allow users to access the web portal using the PC 1768. Further, in an illustrative embodiment, the domain controller 1746 can communicate with at least one wireless network access point 1778 over a data network 1776. In this embodiment, each wireless network access device 1778 can communicate with user wireless devices such as a cellular telephone 1784.

In a particular embodiment, the set-top box devices can include an STB computer program 1774 that is embedded within the STB memory device 1772. The STB computer program 1774 can contain instructions to receive and execute at least one user television viewing preference that a user has entered by accessing an Internet user account via the domain controller 1746. For example, the user can use the PC 1768 to access a web portal maintained by the domain controller 1746 via the Internet. The domain controller 1746 can query the subscriber and system store 1748 via the private network 1710 for account information associated with the user. In a particular embodiment, the account information can associate the user's Internet account with the second set-top box device 1724. For instance, in an illustrative embodiment, the account information can relate the user's account to the second set-top box device 1724 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The STB computer program 1774 can contain instructions to receive many types of user preferences from the domain controller 1746 via the access network 1766. For example, the STB computer program 1774 can include instructions to receive a request to record at least one television program at a video content storage module such as a digital video recorder (DVR) 1782 within the second set-top box device 1724. In this example embodiment, the STB computer program 1774 can include instructions to transmit the request to the DVR 1782, where the television program(s) are recorded. In an illustrative embodiment, the STB computer program 1774 can include instructions to receive from the DVR 1782 a recording status with respect to one or more of the television programs and to transmit at least one message regarding the status to a wireless device, such as the cellular telephone 1784. The message can be received at the CFT switch 1730, for instance, and communicated to the domain controller 1746 across the private network 1710 via the second APP switch 1740. Further, the domain controller 1746 can transmit the message to the wireless data network 1776, directly or via the public network 1712, and on to the wireless network access point 1778. The message can then be transmitted to the cellular telephone 1784. In an illustrative embodiment, the status can be sent via a wireless access protocol (WAP).

Figure 18:
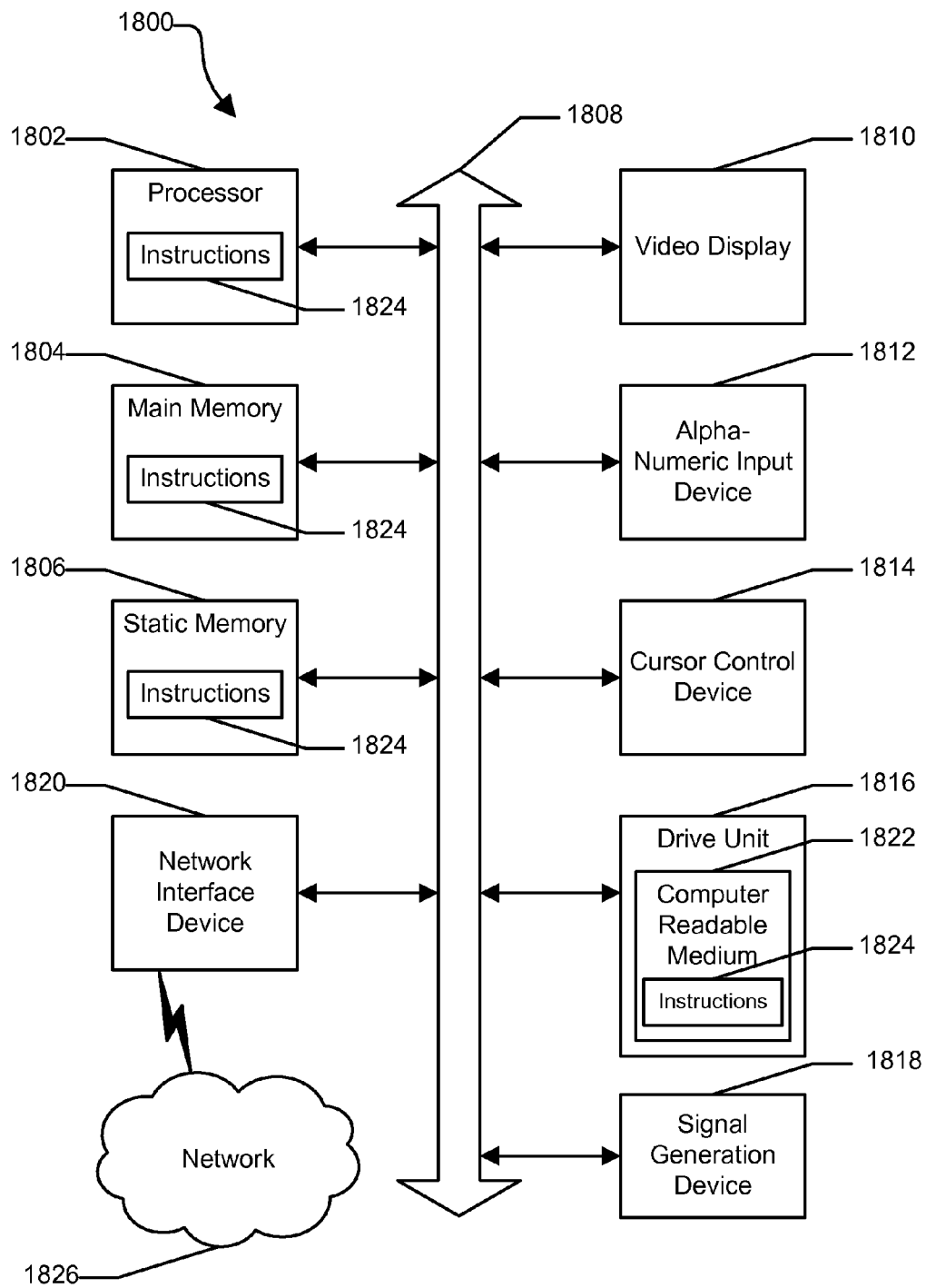
FIG. 18 is a diagram illustrating an example computer system for implementing one or more of the components or techniques described herein in accordance with at least one embodiment of the present disclosure.

FIG. 18 shows an illustrative embodiment of a general computer system 1800 in accordance with at least one embodiment of the present disclosure. The computer system 1800 can include a set of instructions that can be executed to cause the computer system 1800 to perform any one or more of the methods or computer based functions disclosed herein. The computer system 1800 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1800 can also be implemented as or incorporated into, for example, a STB device. In a particular embodiment, the computer system 1800 can be implemented using electronic devices that provide voice, video or data communication. Further, while a single computer system 1800 is illustrated, the term "system" shall also be taken to include any collection of systems or sub-systems that individually or jointly execute a set, or multiple sets, of instructions to perform one or more computer functions.

The computer system 1800 may include a processor 1802, e.g., a central processing unit (CPU), a graphics processing unit (GPU), or both. Moreover, the computer system 1800 can include a main memory 1804 and a static memory 1806 that can communicate with each other via a bus 1808. As shown, the computer system 1800 may further include a video display unit 1810, such as a liquid crystal display (LCD), an organic light emitting diode (OLED), a flat panel display, a solid state display, or a cathode ray tube (CRT). Additionally, the computer system 1800 may include an input device 1812, such as a keyboard, and a cursor control device 1814, such as a mouse. The computer system 1800 can also include a disk drive unit 1816, a signal generation device 1818, such as a speaker or remote control, and a network interface device 1820.

In a particular embodiment, as depicted in FIG. 18, the disk drive unit 1816 may include a computer-readable medium 1822 in which one or more sets of instructions 1824, e.g.

software, can be embedded. Further, the instructions 1824 may embody one or more of the methods or logic as described herein. In a particular embodiment, the instructions 1824 may reside completely, or at least partially, within the main memory 1804, the static memory 1806, and/or within the processor 1802 during execution by the computer system 1800. The main memory 1804 and the processor 1802 also may include computer-readable media. The network interface device 1820 can provide connectivity to a network 1826, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network can communicate voice, video or data over the network 1826. Further, the instructions 1824 may be transmitted or received over the network 1826 via the network interface device 1820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   selecting, at a multimedia receiver, a select multimedia stream from a plurality of multimedia streams available at the multimedia receiver based on user input;
   determining, at the multimedia receiver, based on an analysis of an encoding format of the select multimedia stream an availability of a trickplay feature for controlling a presentation of the select multimedia stream; and
   responsive to determining the availability of the trickplay feature, presenting a visual indicator indicating the availability of the trickplay feature for the select multimedia stream.

2. The method of claim 1, comprising:
presenting the visual indicator for display in response to determining the trickplay feature is available for the select multimedia stream; and
omitting a presentation of the visual indicator for display in response to determining the trickplay feature is unavailable for the select multimedia stream.

3. The method of claim 1, comprising:
presenting a first visual indicator as the visual indicator for display in response to determining the trickplay feature is available for the select multimedia stream; and
presenting a second visual indicator, different than the first visual indicator, as a second visual indicator for display in response to determining the trickplay feature is unavailable for the select multimedia stream.

4. The method of claim 3, wherein the second visual indicator is different than the first visual indicator in at least one of color, luminosity, transparency, shape, size, or position.

5. The method of claim 1, comprising:
presenting for display an array of graphical representations, each graphical representation associated with a corresponding multimedia stream of at least a subset of the plurality of multimedia streams, the array of graphical representations comprising a select graphical representation associated with the select multimedia stream; and
receiving user input indicating selection of the select graphical representation from the array of graphical representations.

6. The method of claim 1, comprising:
presenting for display a listing of a plurality of entries, each entry associated with a corresponding multimedia stream of at least a subset of the plurality of multimedia streams, the listing comprising a select entry associated with the select multimedia stream; and
receiving user input indicating selection of the select entry from the listing.

7. The method of claim 1, wherein the presentation of the visual indicator indicating the availability of the trickplay feature for the select multimedia stream is a first presentation for a limited time period, and further comprising:
detecting motion of a remote controller associated with the multimedia receiver;
presenting the visual indicator in a second presentation responsive to the detected motion; and
presenting the select multimedia stream for display in response to selection of the select multimedia stream.

8. The method of claim 1, comprising detecting an aspect of the select multimedia stream that characterizes whether the select multimedia stream supports the trickplay feature based in part on a source of the select multimedia stream and a buffering capability for the select multimedia stream.

9. The method of claim 1, comprising detecting than aspect of the select multimedia stream that characterizes whether the select multimedia stream supports the trickplay feature based in part on a transmission protocol of the select multimedia stream.

10. The method of claim 1, comprising detecting the aspect of the select multimedia stream that characterizes whether the select multimedia stream supports the trickplay feature based in part on metadata received at the multimedia receiver in association with the select multimedia stream.

11. A non-transitory computer readable medium comprising a set of computer instructions executable by a processor to perform operations comprising:
selecting a select multimedia stream from a plurality of multimedia streams available at the multimedia receiver based on user input;
detecting an aspect of the select multimedia stream that characterizes whether the select multimedia stream supports a trickplay feature, wherein the aspect is detected based on an analysis of at least one of an encoding format of the select multimedia stream, a source of the select multimedia stream or metadata associated with the select multimedia stream;
determining according to the detected aspect an availability of the trickplay feature for controlling a presentation of the select multimedia stream; and
responsive to determining the availability of the trickplay feature, presenting a visual indicator indicating an availability of the trickplay feature for the first multimedia stream.

12. The non-transitory computer readable medium of claim 11, comprising computer instructions executable by a processor to perform operations comprising:
omitting a presentation of the visual indicator in response to determining the trickplay feature is unavailable for the select multimedia stream.

13. The non-transitory computer readable medium of claim 11, comprising computer instructions executable by a processor to perform operations comprising:
presenting a first visual indicator as the visual indicator for display in response to determining the trickplay feature is available for the select multimedia stream; and
presenting a second visual indicator, different than the first visual indicator, as a second visual indicator for display in response to determining the trickplay feature is unavailable for the select multimedia stream.

14. A method comprising:
receiving, at a multimedia receiver, a plurality of multimedia streams;
detecting, at the multimedia receiver, an aspect of each of the plurality of multimedia streams that characterizes which of the plurality of multimedia streams supports a trickplay feature, wherein the aspect is detected based on an analysis of at least one of an encoding format of the plurality of multimedia streams, a source of the plurality of multimedia streams or metadata associated with the plurality of multimedia streams;
determining, for each multimedia stream of the plurality of multimedia streams, according to the detected aspect of each multimedia stream an availability status of a trickplay feature for the multimedia stream;
presenting a plurality of graphical representations for concurrent display, each graphical representation comprising graphical content of a corresponding multimedia stream of the plurality of multimedia streams; and
for each multimedia stream of the plurality of multimedia streams, selectively presenting a visual indicator for display in association with the corresponding graphical representation, the visual indicator indicating an availability of the trickplay feature for the multimedia stream.

15. The method of claim 14, comprising:
presenting the visual indicator in response to determining the trickplay feature is available for a corresponding multimedia stream; and
omitting a presentation of the visual indicator in response to determining the trickplay feature is unavailable for the corresponding multimedia stream.

16. The method of claim 14, comprising:
presenting a first visual indicator as the visual indicator in response to determining the trickplay feature is available for a corresponding multimedia stream; and
presenting a second visual indicator as a second visual indicator in response to determining the trickplay feature is unavailable for the corresponding multimedia stream.

17. The method of claim 14, wherein each graphical representation comprises one of a still image or a video clip.

18. A multimedia receiver comprising: a memory storing computer instructions and being coupled to a processor, wherein the processor when executing the computer instructions performs operations comprising:
selecting a multimedia stream of a plurality of multimedia streams available at the multimedia receiver based on user input;
detecting an aspect of the select multimedia stream that characterizes whether the select multimedia stream supports a trickplay feature, wherein the aspect is detected based on an analysis of at least one of an encoding format of the select multimedia stream, a source of the select multimedia stream or metadata associated with the select multimedia stream;
determining according to the detected aspect an availability of the trickplay feature for controlling a presentation of the select multimedia stream; and
responsive to determining the availability of the trickplay feature, presenting a visual indicator for display based on the availability of the trickplay feature for the select multimedia stream, the visual indicator indicating the availability of the trickplay feature for the select multimedia stream.

19. The multimedia receiver of claim 18 wherein the processor when executing the computer instructions performs operations comprising:
presenting the visual indicator for display in response to determining the trickplay feature is available for the select multimedia stream; and
omitting a presentation of the visual indicator for display in response to determining the trickplay feature is available for the select multimedia stream.

20. The multimedia receiver of claim 19 wherein the processor when executing the computer instructions performs operations comprising:
presenting a first visual indicator as the visual indicator for display in response to determining the trickplay feature is available for the select multimedia stream; and
presenting a second visual indicator, different than the first visual indicator, as a second visual indicator for display in response to determining the trickplay feature is unavailable for the select multimedia stream.

21. The multimedia receiver of claim 19 wherein the processor when executing the computer instructions performs operations comprising:
presenting for display an array of graphical representations of at least a subset of the plurality of multimedia streams, the array of graphical representations comprising a select graphical representation associated with the select multimedia stream; and
receiving user input indicating selection of the select graphical representation from the array of graphical representations.

22. The multimedia receiver of claim 19 wherein the processor when executing the computer instructions performs operations comprising:
presenting a listing of a plurality of entries, each entry associated with a corresponding multimedia stream of at least a subset of the plurality of multimedia streams, the listing comprising a select entry associated with the select multimedia stream; and
receiving user input indicating selection of the select entry from the listing.

* * * * *